(12) United States Patent
Neumann et al.

(10) Patent No.: US 8,216,347 B2
(45) Date of Patent: Jul. 10, 2012

(54) METHOD OF PROCESSING MOLECULES WITH A GAS-LIQUID CONTACTOR

(75) Inventors: David Kurt Neumann, Colorado Springs, CO (US); Andrew R. Awtry, Colorado Springs, CO (US); Jason K. Brasseur, Colorado Springs, CO (US); Keith R. Hobbs, Colorado Springs, CO (US); Boris R. Nizamov, Colorado Springs, CO (US); Thomas Lee Henshaw, Monument, CO (US)

(73) Assignee: Neumann Systems Group, Inc., Colorado Springs, CO (US)

( * ) Notice: Subject to any disclaimer, the term of this patent is extended or adjusted under 35 U.S.C. 154(b) by 0 days.

(21) Appl. No.: 12/950,069

(22) Filed: Nov. 19, 2010

(65) Prior Publication Data

US 2011/0061530 A1  Mar. 17, 2011

Related U.S. Application Data

(60) Division of application No. 12/586,807, filed on Sep. 28, 2009, now Pat. No. 8,113,491, which is a continuation-in-part of application No. 12/459,685, filed on Jul. 6, 2009, now Pat. No. 7,866,638, which is a continuation-in-part of application No. 12/012,568, filed on Feb. 4, 2008, now Pat. No. 7,871,063, which is a continuation of application No. 11/057,539, filed on Feb. 14, 2005, now Pat. No. 7,379,487.

(60) Provisional application No. 61/100,564, filed on Sep. 26, 2008, provisional application No. 61/100,606, filed on Sep. 26, 2008, provisional application No. 61/100,591, filed on Sep. 26, 2008.

(51) Int. Cl.
*B01D 47/06* (2006.01)

(52) U.S. Cl. ........ 95/224; 96/322; 261/118; 261/DIG. 9

(58) Field of Classification Search .................... 95/199, 95/217, 221, 224; 96/271, 322; 261/115–118, 261/DIG. 9
See application file for complete search history.

(56) References Cited

U.S. PATENT DOCUMENTS 441,106 A  11/1890  Monsanto
(Continued)

FOREIGN PATENT DOCUMENTS

GB  2059286 A  4/1981
(Continued)

OTHER PUBLICATIONS

Kohl, et al. Gas Purification, Gulf Professional Publishing, 5 ed., 1997.

(Continued)

*Primary Examiner* — Richard L Chiesa
(74) *Attorney, Agent, or Firm* — Scott J. Hawranek; Sheridan Ross, P.C.

(57) ABSTRACT

The invention relates to a gas liquid contactor and effluent cleaning system and method and more particularly to an array of nozzles configured to produce uniformly spaced flat liquid jets with reduced linear stability. An embodiment of the invention is directed towards a stability unit used with nozzles of a gas liquid contactor and/or an enhancer for stable jet formation, and more particularly to reducing the stability of liquid jets formed from nozzles of the gas liquid contactor. Another aspect of the invention relates to operating the apparatus at a condition that reduces the stability of liquid jets, e.g., a droplet generator apparatus. Yet another aspect of the invention relates to operation of the apparatus with an aqueous slurry. Still another aspect of the invention is directed towards to an apparatus for substantially separating at least two fluids.

27 Claims, 26 Drawing Sheets

U.S. PATENT DOCUMENTS

| | | | |
|---|---|---|---|
| 2,484,277 A | | 10/1949 | Fisher |
| 2,604,185 A | * | 7/1952 | Johnstone et al. ............... 95/219 |
| 2,631,019 A | | 3/1953 | Yates |
| 2,687,614 A | | 8/1954 | Goddard |
| 3,237,381 A | | 3/1966 | Hvostoff et al. |
| 3,465,504 A | | 9/1969 | Oropeza et al. |
| 3,488,924 A | * | 1/1970 | Reeve ............................. 95/198 |
| 3,524,630 A | | 8/1970 | Marion |
| 3,582,050 A | | 6/1971 | Kozak |
| 3,731,461 A | | 5/1973 | Hamon |
| 3,766,489 A | | 10/1973 | Rosenberg et al. |
| 3,840,304 A | | 10/1974 | Hirafuji |
| 3,847,714 A | | 11/1974 | Davies et al. |
| 3,914,348 A | | 10/1975 | Kors et al. |
| 3,934,012 A | | 1/1976 | Schievelbein |
| 3,984,786 A | | 10/1976 | Pike |
| 3,985,860 A | | 10/1976 | Mandelik et al. |
| 4,011,287 A | | 3/1977 | Marley |
| 4,026,682 A | | 5/1977 | Pausch |
| 4,073,832 A | | 2/1978 | McGann |
| 4,099,140 A | | 7/1978 | Snelling et al. |
| 4,102,982 A | | 7/1978 | Weir, Jr. |
| 4,128,206 A | | 12/1978 | Bintner |
| 4,246,245 A | | 1/1981 | Abrams et al. |
| 4,261,511 A | | 4/1981 | Erb et al. |
| 4,269,812 A | | 5/1981 | Edwards et al. |
| 4,284,590 A | | 8/1981 | DeBoer et al. |
| 4,310,476 A | * | 1/1982 | Nahra et al. ................... 261/118 |
| 4,326,553 A | | 4/1982 | Hall |
| 4,340,572 A | | 7/1982 | Ben-Shmuel et al. |
| 4,343,771 A | | 8/1982 | Edwards et al. |
| 4,348,432 A | | 9/1982 | Huang |
| 4,378,236 A | | 3/1983 | Helms |
| 4,403,324 A | | 9/1983 | Woste |
| 4,419,301 A | * | 12/1983 | Nahra et al. ................... 261/118 |
| 4,507,969 A | | 4/1985 | Djordjevic et al. |
| 4,633,623 A | | 1/1987 | Spitz |
| 4,641,785 A | | 2/1987 | Grothe |
| 4,668,498 A | | 5/1987 | Davis |
| 4,720,290 A | | 1/1988 | McCoy |
| 4,740,308 A | | 4/1988 | Fremont et al. |
| 4,744,518 A | | 5/1988 | Toth |
| 4,810,268 A | | 3/1989 | Chambers et al. |
| 4,819,878 A | | 4/1989 | Bailey et al. |
| 4,828,768 A | | 5/1989 | Talmor |
| 4,887,100 A | | 12/1989 | Michaelis et al. |
| 4,893,754 A | | 1/1990 | Ruiz |
| 4,913,225 A | | 4/1990 | Chubb |
| 4,948,402 A | | 8/1990 | Davis |
| 4,968,328 A | | 11/1990 | Duke |
| 4,989,788 A | | 2/1991 | Bendig et al. |
| 5,057,853 A | | 10/1991 | Fisher |
| 1,538,457 A | | 3/1992 | Zoelly |
| 5,269,967 A | | 12/1993 | Achgill |
| 5,330,563 A | | 7/1994 | Yamase et al. |
| 5,364,604 A | | 11/1994 | Spink et al. |
| 5,392,988 A | | 2/1995 | Thayer |
| 5,395,482 A | | 3/1995 | Onda et al. |
| 5,474,597 A | | 12/1995 | Halldin |
| 5,544,571 A | * | 8/1996 | Nahra et al. ..................... 99/454 |
| 5,565,180 A | | 10/1996 | Spink |
| 5,580,531 A | | 12/1996 | Vassiliou et al. |
| 5,615,836 A | | 4/1997 | Graef |
| 5,634,413 A | | 6/1997 | Listner et al. |
| 5,643,799 A | | 7/1997 | Atwater |
| 5,655,255 A | | 8/1997 | Kelly |
| 5,744,110 A | | 4/1998 | Mimura et al. |
| 5,802,095 A | | 9/1998 | Schall |
| 5,833,148 A | | 11/1998 | Steinhilber et al. |
| 5,837,206 A | | 11/1998 | Traffenstedt et al. |
| 5,870,422 A | | 2/1999 | Florentino et al. |
| 5,893,943 A | * | 4/1999 | Durham et al. ................... 95/65 |
| 5,947,390 A | | 9/1999 | Smith |
| 5,974,072 A | | 10/1999 | Hartlove |
| 6,010,640 A | | 1/2000 | Beshore et al. |
| 6,051,055 A | | 4/2000 | Ukawa et al. |
| 6,072,820 A | | 6/2000 | Dickerson |
| 6,090,186 A | | 7/2000 | Spencer |
| 6,228,145 B1 | | 5/2001 | Falk-Pedersen et al. |
| 6,309,711 B1 | | 10/2001 | Tseng et al. |
| 6,459,717 B1 | | 10/2002 | Henshaw |
| 6,550,751 B1 | | 4/2003 | Brown et al. |
| 6,612,509 B2 | | 9/2003 | Holmstrom |
| 6,652,624 B2 | | 11/2003 | Ku et al. |
| 6,656,253 B2 | * | 12/2003 | Willey et al. ....................... 96/27 |
| 6,714,570 B1 | | 3/2004 | Brown |
| 6,760,406 B2 | | 7/2004 | Hertz et al. |
| 6,824,071 B1 | | 11/2004 | McMichael |
| 6,830,608 B1 | | 12/2004 | Peters |
| 6,843,835 B2 | * | 1/2005 | Fornai et al. ....................... 96/53 |
| 6,918,949 B1 | | 7/2005 | Peters |
| 6,938,434 B1 | | 9/2005 | Fair |
| 7,021,571 B1 | | 4/2006 | Lawson et al. |
| 7,066,398 B2 | | 6/2006 | Borland et al. |
| 7,116,696 B2 | | 10/2006 | Emanuel |
| 7,163,163 B2 | | 1/2007 | Waddelow |
| 7,219,849 B1 | | 5/2007 | Hedger |
| 7,285,309 B2 | | 10/2007 | Nakamura et al. |
| 7,318,855 B2 | | 1/2008 | Newman et al. |
| 7,379,487 B2 | | 5/2008 | McDermott et al. |
| 7,866,638 B2 | | 1/2011 | Neumann et al. |
| 2001/0013554 A1 | | 8/2001 | Borland et al. |
| 2003/0056648 A1 | * | 3/2003 | Fornai et al. ....................... 95/65 |
| 2003/0080447 A1 | | 5/2003 | Ye et al. |
| 2003/0155451 A1 | | 8/2003 | Nakamura et al. |
| 2003/0227955 A1 | | 12/2003 | Emanuel |
| 2004/0131531 A1 | | 7/2004 | Geerlings et al. |
| 2004/0183216 A1 | | 9/2004 | Cross |
| 2005/0002847 A1 | | 1/2005 | Maroto-Valer et al. |
| 2005/0045752 A1 | | 3/2005 | Waddelow |
| 2005/0156064 A1 | | 7/2005 | Tanigaki et al. |
| 2005/0229553 A1 | | 10/2005 | TeGrotenhuis et al. |
| 2006/0016728 A1 | | 1/2006 | Shorts |
| 2006/0182163 A1 | | 8/2006 | McDermott et al. |
| 2007/0085227 A1 | | 4/2007 | Tonkovich et al. |
| 2007/0189949 A1 | | 8/2007 | Hsieh et al. |
| 2008/0119356 A1 | | 5/2008 | Ryu et al. |
| 2008/0175297 A1 | | 7/2008 | McDermott et al. |
| 2010/0089231 A1 | | 4/2010 | Neumann et al. |
| 2010/0089232 A1 | | 4/2010 | Neumann et al. |
| 2010/0092368 A1 | | 4/2010 | Neumann et al. |
| 2010/0319539 A1 | | 12/2010 | Neumann et al. |
| 2010/0320294 A1 | | 12/2010 | Neumann et al. |
| 2011/0061531 A1 | | 3/2011 | Neumann et al. |
| 2011/0072968 A1 | | 3/2011 | Neumann et al. |
| 2011/0081288 A1 | | 4/2011 | Neumann et al. |
| 2011/0126710 A1 | | 6/2011 | McDermott et al. |

FOREIGN PATENT DOCUMENTS

| | | |
|---|---|---|
| JP | 59-88510 | 5/1984 |

OTHER PUBLICATIONS

Yeh, et al., Semi-batch absorption and regeneration studies for CO2 capture by aqueous ammonia, Fuel Processing Technology, vol. 86, Issues 14-15, pp. 1533-1546, Oct. 2005.

Van Holst, J., et al. CO2 Capture from Flue Gas Using Amino Acid Salt Solutions, Proceedings of 8th International Conference on Greenhouse Gas Control Technologies, 2006.

Plasynski, et al. Carbon Dioxide Capture by Absorption with Potassium Carbonate, Carbon Sequestration, Project Facts, USDOE, NETL, Apr. 2008, 2 pgs.

International Search Report and Written Opinion of the International Searching Authority for PCT/US2009/049707 mailed Aug. 31, 2009, 2 pgs.

International Search Report and Written Opinion of the International Searching Authority for PCT/US2009/58634 mailed Jan. 13, 2010, 11 pgs.

International Search Report and Written Opinion of the International Searching Authority for PCT/US2009/58637 mailed Jan. 13, 2010, 7 pgs.

Huijgen, et al., "Cost Evaluation of CO2 sequestration by acqueous mineral carbonation," Energy Conversion and Management, 48, pp. 1923-1035, 2007.

Cullinane, "Thermodynamics and Kinetics of Acqueous Piperazine with Potassium Carbonate for Carbon Dioxide Absorption", pp. 167-171, Dissertation, The University of Texas at Austin, 2005.

Howells, "Super-Water [R] Jetting Applications From 1974 to 1999", pp. 1-21, 1999.

Oyeneken, et al., "Alternative Stripper Configurations for CO2 Capture by Acqueous Amines", AIChE Journal, vol. 53, No. 12, pp. 3144-3154, 2007.

Trachtenberg, MC, et al. "Seventh International Conference on Greenhouse Gas Control Technologies (GHGT-7)," Vancouver, BC, 2004, 1751-1754. Trachtenberg, MC, et al. "Seventh International Conference on Greenhouse Gas Control Technologies (GHGT-7)," Vancouver, BC, 2004, 1751-1754.

International Search Report and Written Opinion of the International Searching Authority for PCT/US09/58631 mailed Jul. 28, 2010.

International Preliminary Report on Patentability for International (PCT) Patent Application No. PCT/US2009/049707, mailed Nov. 8, 2010.

International Preliminary Report on Patentability for International (PCT) Patent Application No. PCT/US2009/58634, mailed Nov. 22, 2010.

International Preliminary Report on Patentability for International (PCT) Patent Application No. PCT/US2009/58637, mailed Feb. 15, 2011.

"Carbon Dioxide Storage by Mineral Carbonation," IEA, Report No. 2005/11, Sep. 2005, 41 pages.

"Chilled Ammonia-based Wet Scrubbing for Post-Combustion CO2 Capture," DOE/NETL-401-021507, Feb. 2007, 78 pages.

Ciferno et al., "An Economic Scoping Study for CO2 Capture Using Aqueous Ammonia," DOE/NETL Final Report, 2005, pp. 1-15.

Drbal et al. (eds.), Power Plant Engineering by Black & Veatch, Chapman & Hall, 1996, pp. 1-879.

Kodama et al., "Development of a new pH-swing CO2 mineralization process with a recyclable reaction solution," Energy, May 2008, vol. 33, pp. 776-784.

Lani et al., "Update on DOE/NETL's Advanced Nox Emissions Control Technology R&D Program," U.S. Department of Energy, National Energy Laboratory, Science Applications International Corporation, Nov. 2006, pp. 1-18.

O'Conner et al., "Aqueous Mineral Carbonation: Mineral Availability, Pretreatment, Reaction Parametrics, and Process Studies," National Energy Technology Laboratory (formerly Albany Research Center), DOE/ARC-TR-04-002, Mar. 2005, 459 pages.

Cullinane "Thermodynamics and Kinetics of Aqueous Piperazine with Potassium Carbonate for Carbon Dioxide Absorption," Dissertation, The University of Texas at Austin, May 2005, pp. 209-211.

Search Report for European Patent Application No. 09816647.3, dated Feb. 10, 2012 7 pages.

Search Report for European Patent Application No. 09817000.4, dated Feb. 10, 2012 12 pages.

Search Report for European Patent Application No. 09817003.8, dated Feb. 15, 2012 7 pages.

Definition of "sheet" as found in the Free Dictionary online. Www.thefreedictionary/sheet (Dec. 16, 2011).

Definition of "planar" as found in the Free Dictionary online. Www.thefreedictionary/planar (Dec. 16, 2011).

Extended Search Report for European Patent Application No. 09817006.1, dated Mar. 28, 2012.

* cited by examiner

202

210

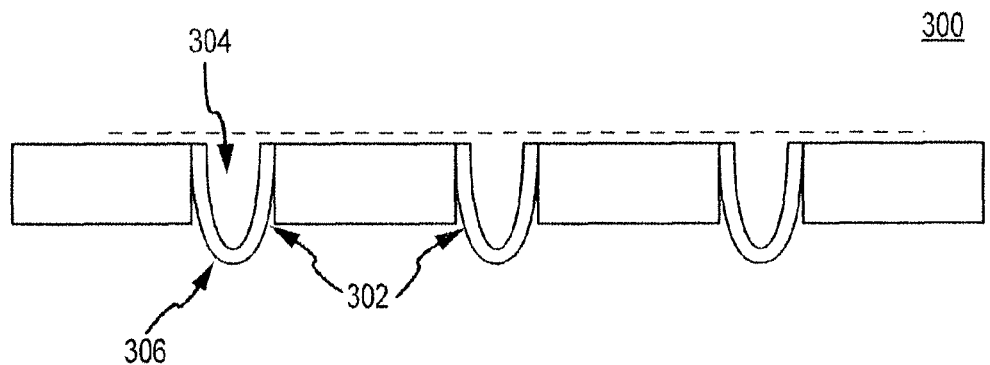
FIG.3A
FIG. 3B
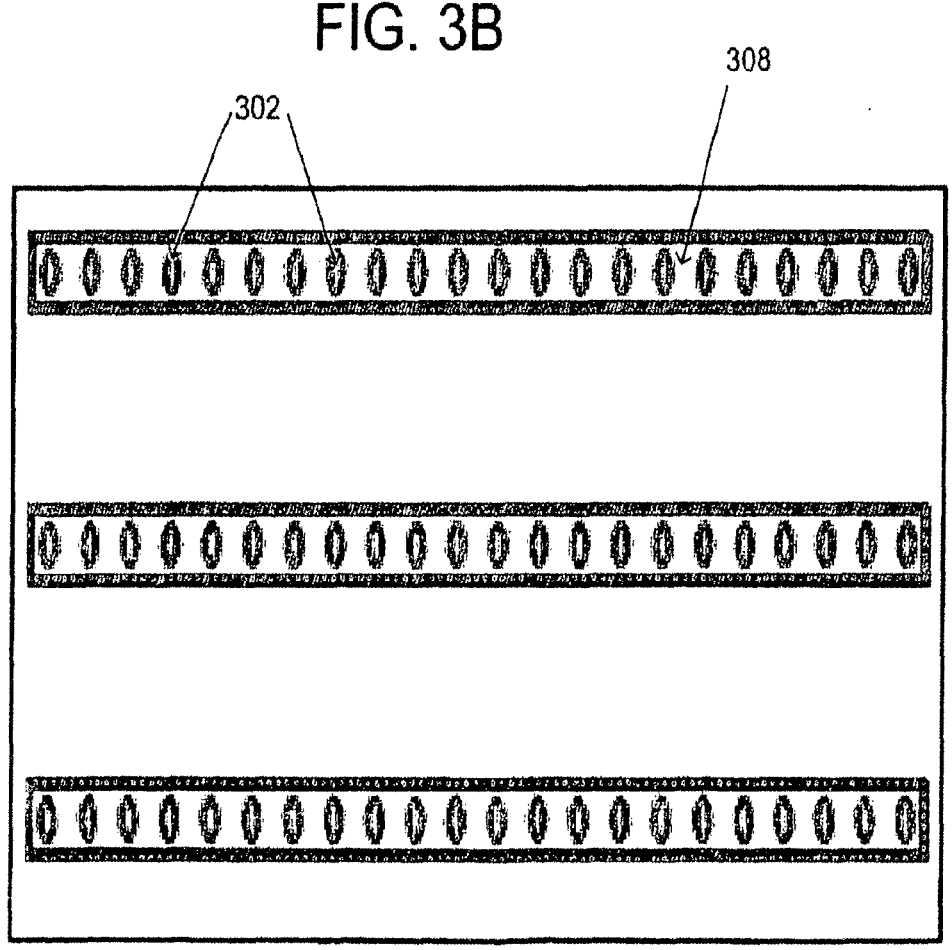

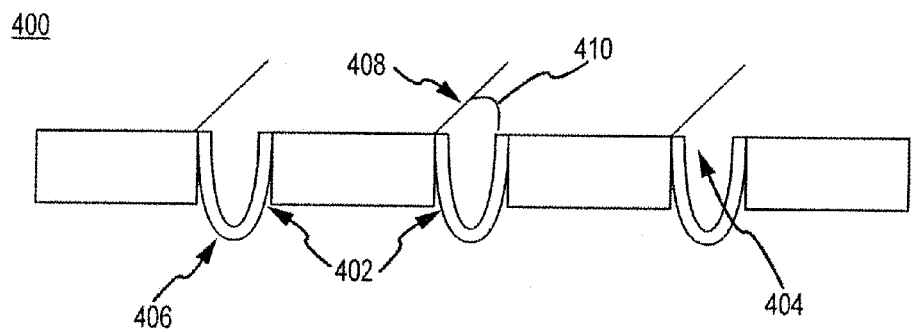
FIG.4A
FIG. 4B
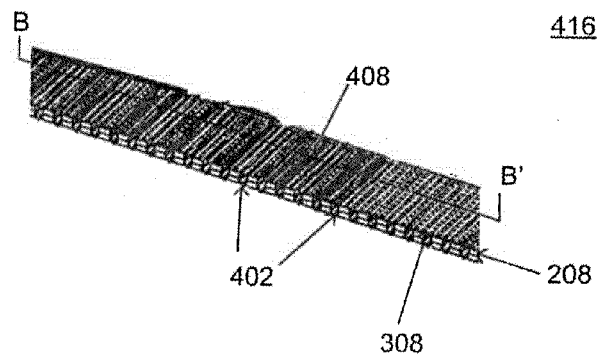
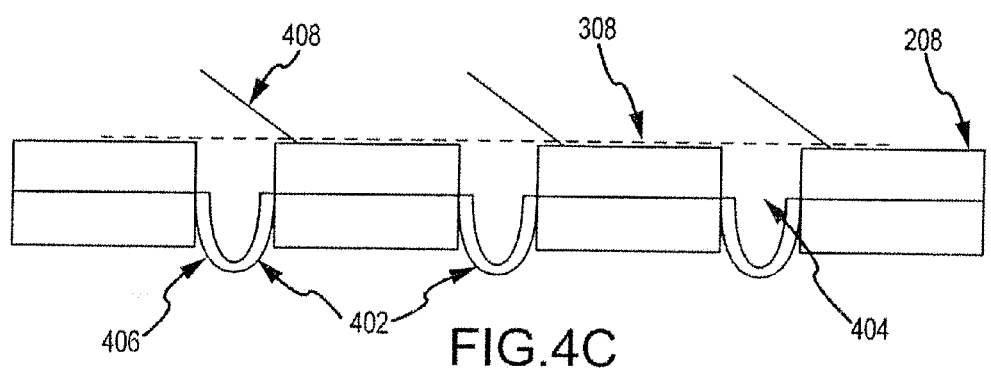
FIG.4C

JET FACE	SIDE

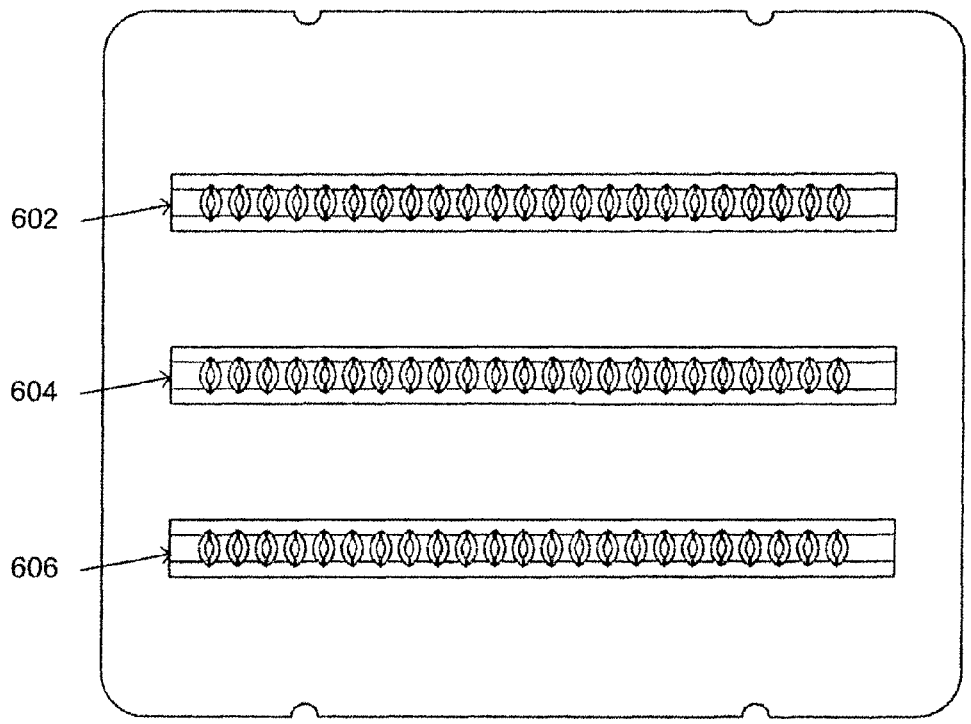

FIG. 12C
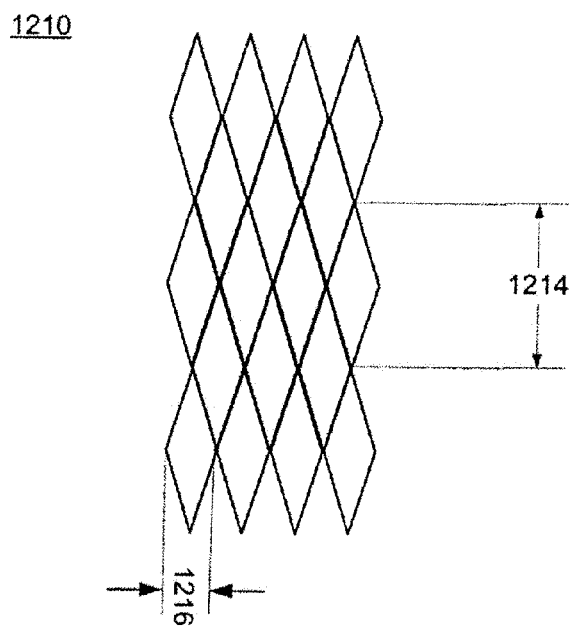
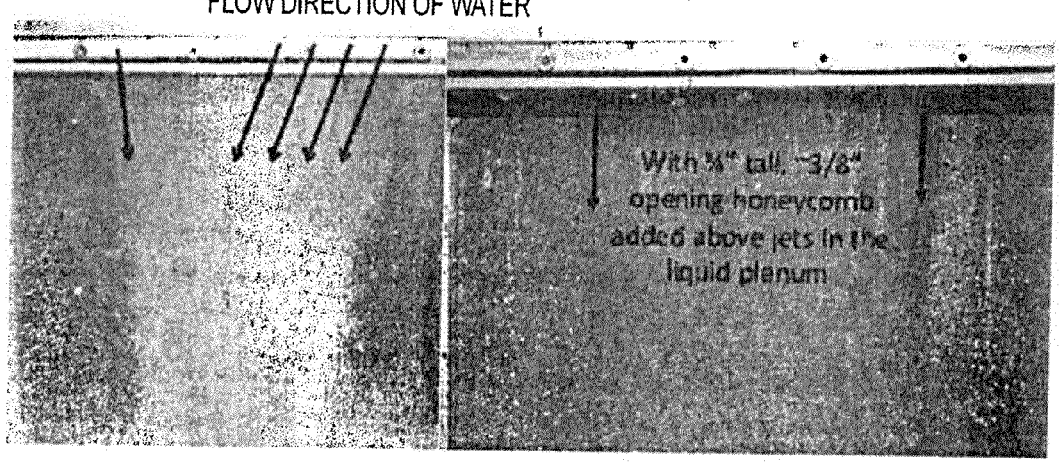
FIG.12D  FIG.12E

METHOD OF PROCESSING MOLECULES WITH A GAS-LIQUID CONTACTOR

This application claims the benefit of and is a divisional of application Ser. No. 12/586,807, entitled "Gas-Liquid Contactor Apparatus and Nozzle Plate," filed on Sep. 28, 2009, now U.S. Pat. No. 8,113,491, which is a continuation-in-part of application Ser. No. 12/459,685, entitled "Gas Liquid Contactor and Effluent Cleaning System and Method," filed on Jul. 6, 2009, now U.S. Pat. No. 7,866,638, which is a continuation-in-part of application Ser. No. 12/012,568, entitled "Two Phase Reactor," filed on Feb. 4, 2008, now U.S. Pat. No. 7,871,063, which is a continuation of U.S. patent application Ser. No. 11/057,539, entitled "Two Phase Reactor," filed on Feb. 14, 2005, now U.S. Pat. No. 7,379,487, and also claims the benefit of U.S. Provisional Application No. 61/100,564, entitled "System for Gaseous Pollutant Removal," filed on Sep. 26, 2008, U.S. Provisional Application No. 61/100,606, entitled "Liquid-Gas Contactor System and Method," filed on Sep. 26, 2008, and U.S. Provisional Application No. 61/100,591, entitled "Liquid-Gas Contactor and Effluent Cleaning System and Method," filed on Sep. 26, 2008; all of which are herein incorporated by reference as if set forth in their entireties.

BACKGROUND OF THE INVENTION

1. Field of the Invention

The invention generally relates to an apparatus, and more particularly to a stability unit and/or enhancer for increasing the stability of liquid jets formed from nozzle plates in the apparatus. Another aspect of the invention relates to operating the apparatus at a condition that reduces the stability of liquid jets, e.g., a droplet generator apparatus. Yet another aspect of the invention relates to operation of the apparatus with an aqueous slurry.

2. Discussion of the Related Art

The absorption of a gas into a liquid is a key process step in a variety of gas liquid contacting systems. Gas liquid contactors, also known as gas liquid reactors, can be classified into surface and volume reactors where the interfacial surface area between the two phases is created at the liquid surface and within the bulk liquid, respectively. There are many examples of surface gas liquid reactors such as rotating disks and liquid jet contactors. Rotating disk generators are disks (rotors) partially immersed in a liquid and exposed to a stream of gas. A thin film of liquid solution is formed on the rotor surface and is in contact with a co-current reagent gas stream. The disk is rotated to refresh the liquid reagent contact with the gas. In a volume gas liquid reactor, the gas phase is dispersed as small bubbles into the bulk liquid. The gas bubbles can be spherical or irregular in shape and are introduced into the liquid by gas spargers. The bubbles can be mechanically agitated to increase the mass transfer.

In many gas liquid contacting systems, the rate of gas transport to the liquid phase is controlled by the liquid phase mass transfer coefficient, k, the interfacial surface area, A, and the concentration gradient, delta C, between the bulk fluid and the gas liquid interface. A practical form for the rate of gas absorption into the liquid is then:

$$\Phi = \phi a = k_G a(p-p_i) - k_L a(C_L^* - C_L)$$

where the variable $\Phi$ is the rate of gas absorption per unit volume of reactor (mole/(cm$^3$ s)); $\phi$ is the average rate of absorption per unit interfacial area (mole/(cm$^2$ s)); $a$ is the gas liquid interfacial area per unit volume (cm$^2$/cm$^3$, or cm$^{-1}$); $p$ and $p_i$ are the partial pressures (bar) of reagent gas in the bulk gas and at the interface, respectively; $C_L^*$ is the liquid side concentration (mole/cm$^3$) that would be in equilibrium with the existing gas phase partial pressure, $p_i$; $C_L$ (mole/cm$^3$) is the average concentration of dissolved gas in the bulk liquid; and $k_G$ (mole/(cm$^2$*s*bar)) and $k_L$ (cm/s) are gas side and liquid side mass transfer coefficients, respectively.

In the related art, there are many approaches to maximizing the mass transfer and specific surface area in gas contactor systems. The principal approaches include gas-sparger, wetted wall jet, and spray or atomization. The choice of gas liquid contactor is dependent on reaction conditions including gas/liquid flow, mass transfer, and the nature of the chemical reaction. Table 1 summarizes various mass transfer performance features of some related art gas liquid reactors. To optimize the gas absorption rate, the parameters $k_L$, $a$, and $(C_L^* - C_L)$ must be maximized. In many gas liquid reaction systems the solubility of the $C_L^*$ is very low and control of the concentration gradient, therefore, is limited. Thus, the primary parameters to consider in designing an efficient gas liquid flow reactor are mass transfer and the interfacial surface area to reactor volume ratio, which is also known as the specific surface area.

TABLE 1

COMPARISON OF CONVENTIONAL GAS LIQUID REACTOR PERFORMANCE

| Reactor Type | β (%, gas liquid volumetric flow rate ratio) | $k_G$ (mole/ cm$^2$s atm) × 10$^4$ | $k_L$ (cm/s) × 10$^2$ | $a$ (cm$^{-1}$) | $k_L a$ (s$^{-1}$) × 10$^2$ |
|---|---|---|---|---|---|
| Packed Column (counter-current) | 2-25 | 0.03-2 | 0.4-2 | 0.1-3.5 | 0.04-7.0 |
| Bubble Reactors | 60-98 | 0.5-2 | 1-4 | 0.5-6 | 0.5-24 |
| Spray Columns | 2-20 | 0.5-2 | 0.7-1.5 | 0.1-1 | 0.07-1.5 |
| Plate Column (Sieve Plate) | 10-95 | 0.5-6 | 1-20 | 1-2 | 1-40 |

There are various gas liquid contacting reactors whose performance is dependent on interfacial contact area. For example, the chemical oxygen iodine laser (COIL) produces laser energy from a chemical fuel consisting of chlorine gas (Cl$_2$) and basic hydrogen peroxide (BHP). The product of this reaction is singlet delta oxygen, which powers the COIL. The present technology uses circular jets of liquid BHP mixed with Cl$_2$ gas to produce the singlet delta oxygen. In a typical generator, the jets are on the order of 350 microns in diameter or smaller. To generate the jets, the liquid BHP is pushed under pressure through a nozzle plate containing a high density of holes. This produces a high interfacial surface area for contacting the Cl$_2$ gas. The higher the surface area, the smaller the generator will be and the higher the yield of excited oxygen that can be delivered to the laser cavity.

Smaller and more densely packed jets improve the specific surface area, but are prone to clogging and breakup. Clogging is a serious problem since the reaction between chlorine and basic hydrogen peroxide produces chlorine salts of the alkali metal hydroxide used to make the basic hydrogen peroxide. Clogging also limits the molarity range of the basic hydrogen peroxide, which reduces singlet oxygen yield and laser power. The heaviest element of the COIL system is this chemical fuel. Problems inherent in producing the fuel increase the weight and decrease the efficiency of the COIL laser as a whole. Thus, there exists a need for a COIL laser that has increased efficiency and lower weight than present designs.

In another example, gas liquid contactors are also used in aerobic fermentation processes. Oxygen is one of the most important reagents in aerobic fermentation. Its solubility in aqueous solutions is low but its demand is high to sustain culture growth. Commercial fermenters (>10,000 L) use agitated bubble dispersion to enhance the volumetric mass transfer coefficient $k_{La}$. The agitation helps move dissolved oxygen through the bulk fluid, breaks up bubble coalescence, and reduces the boundary layer surrounding the bubbles. The interfacial area in these systems is increased by increasing the number of bubbles in the reactor and reducing the size of the bubble diameter. However, oxygen mass transfer to the microorganism is still constrained by the relatively small interfacial surface area of the bubble and the short bubble residence times. Current sparger systems (bubble dispersion) show a relatively small volumetric mass transfer coefficient $k_{La}$, (about 0.2/s); therefore, a new approach for generating maximum interfacial surface area is desired to overcome these mass transfer limitations.

In designing systems for industrial applications, consideration must be given to both cost and efficiency. Conventional wisdom generally precludes that both can be optimally obtained simultaneously. In the case of gas liquid contactors, the conventional wisdom is generally maintained in industrial applications such as chemical processing, industrial biological applications, pollution control, or similar processes requiring reacting or dissolving a gas phase chemistry with a liquid phase in a dynamic flow system.

In the example of pollution control, the standard methodology of removing a target compound or compounds in a wet process is a countercurrent flow system utilizing fine droplets of liquid phase falling through a flowing gas phase 180° in an opposite direction. Normally, gravity is used to draw the liquid phase to a capture sump at the base of a column or tower. The gas phase flows up through the same column or tower. This gas phase is then captured for further processing or released to the atmosphere.

In order to accommodate for larger scale chemical processes, the column or tower must be scaled linearly with the size of the desired process either by length or diameter. The current logical methodology is to increase the scale of a single unit process since capital costs of a single unit process generally do not scale linearly with size.

Another downside of standard countercurrent, gravitational or aerosol/droplet gas liquid contactors is that gas flows must be at a low enough velocity such that gravity effects are greater than the buoyancy of the droplets. Regardless, significant evaporation of the liquid reactant generally does occur since contact times are long, requiring significant capture of that vapor prior to secondary processing or release.

SUMMARY OF THE INVENTION

Accordingly, the invention is directed to an apparatus and method that substantially obviate one or more of the problems due to limitations and disadvantages of the related art.

An advantage of the invention is to provide a stability unit to increase the stability of jets formed from a nozzle plate.

Another advantage of the invention is to provide an enhancer to increase the stability of jets formed from a nozzle plate.

In a preferred embodiment, it is beneficial to maximize the specific area to increase contact time between the gas and liquid. This can be accomplished by minimizing the jet-jet spacing, thus tightly packing the nozzles used to generate the liquid jets. In order to take advantage of the high jet density, aspects of the invention are directed to increasing stability of jet formation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an embodiment of the invention is directed towards a gas liquid contactor apparatus including a liquid inlet, a gas inlet, and a gas outlet. The apparatus also includes a nozzle plate including an array of nozzles in communication with the liquid inlet and the gas inlet. The nozzle plate includes a stability unit coupled to the nozzle plate that is configured to reduce instability of jets formed from the gas liquid contactor.

Another embodiment of the invention is directed towards a nozzle plate for use in a gas liquid contactor. The nozzle plate includes a plate and an array of nozzles on the plate. The nozzle plate also includes a stability unit coupled to the plate. The stability unit is configured to reduce instability of jets formed from the nozzle plate.

Still another embodiment of the invention is directed towards a method of using an enhancer to reduce instability of jets formed from a nozzle plate of a gas liquid contactor. The method includes applying an enhancer to an inlet stream of a gas liquid contactor to reduce instability of jets formed from the gas liquid contactor. The method also includes forming a plurality of essentially planar liquid jets, each of said liquid jets including a planar sheet of liquid, where the plurality of liquid jets is arranged in substantially parallel planes. Further the method includes providing a gas with at least one reactive or soluble gas phase molecule and removing at least a portion of the gas phase molecules by a mass transfer interaction between the gas phase molecules and the liquid jets.

Yet another embodiment is directed towards a method of processing gas phase molecules with a gas liquid contactor. The method includes forming a plurality of instable liquid jets, the instable liquid jets include a distribution of drops from an array of nozzles. Gas is provided with at least one reactive or soluble gas phase molecule. At least a portion of the gas phase molecules are removed by a mass transfer interaction between the gas phase molecules and the distribution of drops.

Still another embodiment is directed towards a method of processing gas phase molecules with a gas liquid contactor. The method includes forming a plurality of essentially planar liquid jets, each of said liquid jets includes a planar sheet of liquid and the plurality of liquid jets are arranged in substantially parallel planes. The essentially planar liquid jets are formed with an aqueous slurry. At least one reactive or soluble gas phase molecule is provided and at least a portion of the gas phase molecules is removed by a mass transfer interaction between the gas phase molecules and the liquid jets.

Still yet another embodiment of the invention is directed towards a method of separating at least two fluids with an apparatus. The method includes heating at least one of the at least two fluids to a partial pressure of the at least one of the at least two fluids. The method also includes removing at least a portion of at least one of the at least two fluids by forming a plurality of essentially planar liquid jets with the at least two liquids, each of said liquid jets comprising a planar sheet of liquid, said plurality of liquid jets arranged in substantially parallel planes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings:

FIG. 3A illustrates a cross-sectional view of a nozzle with a mesh according to another embodiment of the invention;

FIG. 3B illustrates a top down view of a nozzle with a mesh according to FIG. 3A;

FIG. 4A illustrates a cross-sectional view of a nozzle with a diverter unit according to another embodiment of the invention;

FIG. 4B illustrates a perspective view of a nozzle with a diverter unit, feed channel and mesh according to another embodiment of the invention;

FIG. 4C illustrates a cross-sectional view of the nozzle in FIG. 4B along line B to B';

FIG. 6A illustrates an entrance side of a nozzle plate including 24 nozzles used in Example 2;

FIG. 12C illustrates a honeycomb feed channel structure used in Example 7;

FIG. 12D is a photograph of a side view of jets formed in Example 7;

FIG. 12E is a photograph of a side view of jets formed in Example 7;

DETAILED DESCRIPTION OF THE ILLUSTRATED EMBODIMENTS

Figure 1:
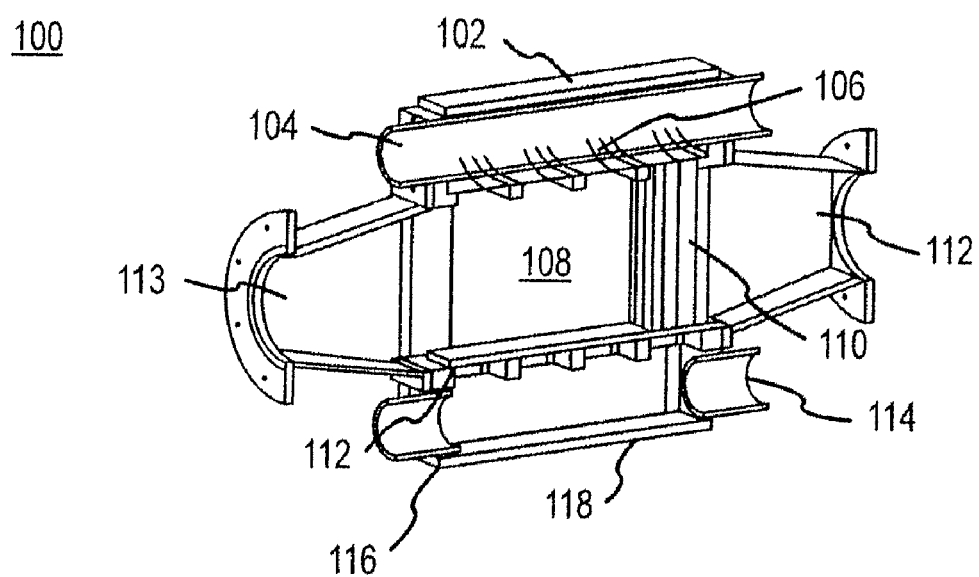
FIG. 1 illustrates a block diagram of a system for producing a flat jet according to an embodiment of the invention.

The invention generally relates to an apparatus, and more particularly to a stability unit and/or enhancer for increasing the stability of liquid jets formed from nozzle plates in the apparatus. Another aspect of the invention relates to operating the apparatus at a condition that reduces the stability of liquid jets, e.g., a droplet generator apparatus. Yet another aspect of the invention relates to operation of the apparatus with an aqueous slurry. Aspects of the invention relate to a gas liquid contactor and effluent cleaning system and method and more particularly to an array of nozzles configured to produce stable liquid jets.

A performance parameter in liquid-gas contactors is the specific area ($cm^{-1}$) of the liquid jets formed from gas liquid contactors of the invention. The specific area is the ratio of the liquid jet total surface area to the effective volume the jet occupies. Under normal operating conditions liquid exits an array of nozzles configured to produce liquid jets as described in U.S. patent application Ser. No. 12/459,685, entitled "Gas liquid contactor and effluent cleaning system and method," filed on Jul. 6, 2009, which is hereby incorporated by reference as if fully set forth herein. However, in operation jet instability may arise and aspects of this invention are directed towards reducing the jet instability.

In a preferred embodiment, it is beneficial to maximize the specific area to increase contact time between the gas and liquid. This can be accomplished by minimizing the jet-jet spacing, thus tightly packing the nozzles used to generate the liquid jets. In order to take advantage of the high jet density, stable jet formation is desired.

In operation it was found that jet instability arises from coupling of the formed jet to noise sources, which includes at least mechanical vibrations, fluid oscillations, nozzle-to-nozzle fluid competition, and gas feed instabilities. These noise sources lead to the accelerated development of the linear sheet instability which can result in jet destroying collisions between neighboring jets.

In one embodiment, jet instability may be characterized as linear sheet instability. The linear sheet instability may manifest itself as spatial oscillations in the formed jet. If amplitude off the oscillation becomes large, this instability becomes important. For instance, when multiple jets are placed in close proximity and the number of jets in the apparatus is increased. The instability has been found to cause jets to break up due to jet-jet collisions resulting from the linear sheet instability. To maximize the specific area, the jet-jet spacing is minimized, thus to realize the full potential the linear sheet instability should be reduced. Moreover, feed oscillations and improperly controlled fluid feed to the jets may also drive the linear sheet instability causing jets to break up. For example, the feed oscillations may be caused by the pump vanes.

An embodiment of the invention is directed towards a gas liquid contactor to produce stable liquid jets. The gas liquid contactor includes a liquid inlet and outlet and a gas inlet and outlet. The gas liquid contactor includes a nozzle plate including an array of nozzles in communication with the liquid inlet and the gas inlet. The nozzle plate may be in the form of a jet box. The gas liquid contactor includes a stability unit coupled to the nozzle plate configured to reduce instability of jets formed from the gas liquid contactor. The nozzles and jet box are described in detail with reference to U.S. patent application Ser. No. 12/459,685, entitled "Gas liquid contactor and effluent cleaning system and method," filed on Jul. 6, 2009, which is hereby incorporated by reference as if fully set forth herein.

In a preferred embodiment, the stability unit is configured to increase instability of jets formed from the gas liquid contactor, e.g., decreasing the amplitude of the linear sheet instability. In addition, the stability unit may minimize oscillations by properly choosing a pump vane frequency that can be easily damped out by downstream flow controlling orifices or filters.

In a preferred embodiment, liquid feed is configured to flow in a direction substantially above the nozzles, e.g., configured to flow in the direction of the nozzle exit. The stability unit may be configured to change the momentum of the liquid inlet, e.g., reduce oscillations in momentum as oscillations in the nozzle feed momentum result in oscillations in the formed jet. In addition, reduction of external noise sources will also decrease the amplitude of the linear sheet instability. Mechanical vibrations serve as a driving potential for the linear sheet instability. The excess energy is coupled into the jets by mechanical oscillations which can affect the feed to the jets, or cause vibrations. Both result in adding energy into the linear sheet instability, leading to jet break up. Therefore, standard vibration isolation practices can be used to damp the external noise sources.

In embodiments of the invention, the stability unit may include at least one of feed channels, a mesh, a diverter unit and combinations thereof. The stability unit is configured to reduce jet instability.

The feed channels at least partially surround at least one nozzle in the array of nozzles. The feed channels are configured to change the momentum of a liquid from the liquid inlet, that is, redirect the flow to be substantially orthogonal to the nozzle inlet, thereby reducing instability of jets. The feed channels can have a height in the range from about 1 mm to about 25 mm or greater. In a preferred embodiment, the height of the feed channel is in a range from about 8 mm to about 12 mm. The feed channels may also be configured in a number of different geometric configurations, such as a honeycomb structure. The feed channels form individual flow channels such that liquid feed is better directed into the nozzles and the fluid feed competition between adjacent nozzles is reduced/eliminated. This can reduce/eliminate a significant aspect that creates linear sheet instability.

The mesh may be formed on at least one nozzle in the array of nozzles. The mesh is configured to disrupt the momentum of liquid from the inlet when directed to a nozzle inlet, thereby reducing instability of jets. In a preferred embodiment, the mesh randomizes or rests the momentum of the liquid. The mesh may be arranged directly over the entrance of the nozzle or on top of the feed channel. The mesh may be configured to uniform or non-uniform spacing. In a preferred embodiment, the mesh is formed in a substantially orthogonal grid pattern; each grid of the pattern has an open region ranging from about 0.1 mm to about 2 mm. In another preferred embodiment, the mesh is a course screen providing about a 67% obstruction of the nozzle. In other embodiments, the mesh may be configured to provide an obstruction in the range from about 5% to about 95%. In a preferred embodiment, the obstruction is in the range from about 35% to about 75%.

The diverter unit is arranged at an inlet section of at least one nozzle in the array of nozzles and configured to change momentum of the liquid from the liquid inlet, thereby reducing instability of the nozzle. In a preferred embodiment, each row and/or column of nozzles includes a diverter unit. In an embodiment, the diverter is arranged at an angle in the range from about 5 degrees to about 85 degrees from the nozzle inlet surface. In a preferred embodiment, the angle is in a range from about 20 degrees to about 70 degrees. In a most preferred embodiment, the angle is in a range from about 30 degrees to about 60 degrees. It is noted that the diverter unit may be configured so the angle is 45 degrees. The diverter unit may be arranged on feed channels or directly on the surface of the nozzle. The diverter unit may also be used with or without a mesh. Of course, other structures of various geometries may also be used to reduce instability of jets.

In other embodiments of the invention the amplitude of the linear sheet instability can be reduced by either optimizing the jet fluid composition and/or by minimizing external noise sources. This optimization of fluid composition may be conducted with or without a stability unit. Optimizing the jet fluid composition can reduce the effect of noise sources on jet formation which drive the linear sheet instability. The optimization of fluid composition is directed towards optimizing jet formation by adjusting the density, surface tension, and viscosity of the fluid composition.

In embodiments of the invention, an enhancer is used as or with the fluid, e.g., sorbent, to increase or decrease at least one of viscosity, surface tension, density and combinations thereof, of the liquid. The enhancer may include an aqueous solution including a polymer such as a linear macromolecular partially hydrolyzed polyacrylamide comprising a molecular weight in a range from about 16 million to about 18 million, a glycol solution in a range of about 1% (w/w) to about 100% (w/w). Other enhances may include at least one of basic hydrogen peroxide, glycerol, ethylene glycol, polyvinyl alcohol, xanthum gum, cellulose ether, polypropylene glycol, and polyoxyalkylene alkyl ether.

Other embodiments of the invention are directed to increasing fluid density. As density increases, the amount of energy required to maintain a given oscillation also increases. Thus, for a constant noise source, increasing the fluid density reduces the linear sheet instability amplitude. Similarly, the same effect is achieved by increasing the fluid viscosity. Viscosity is the measure of the resistance of a fluid being deformed by either shear stress or extensional stress. As a result, as the viscosity is increased the stability of the jet is increased. In the case of fluid surface tension, the smaller the surface tension the larger the produced jet at a given plenum pressure. These effects have been experimentally verified by using enhancers such as glycol and such as Super-water® as discussed herein.

In a preferred embodiment, Super-water® is used as an enhancer to reduce the instability of jets. Super-water® is an aqueous solution including a polymer obtained from Berkeley Chemical Research, Inc. More specifically, the polymer is a linear macromolecular partially hydrolyzed polyacrylamide having a molecular weight in a range from about 16 to about 18 million. Super-water® is also described in Howells, "Super-Water [R] Jetting Applications From 1974 to 1999", pp. 1-21, 1999, which is hereby incorporated by reference as if fully set forth herein.

However, any chemical as known in the art may also be used to adjust properties, e.g., density, viscosity, surface tension, of the liquid used to remove containments. Accordingly, the effective chemistry of the inlet liquid should be considered. That is, a variety of liquids having an effective chemistry may be utilized in the invention and the choice of liquid depends on the desired operation of the apparatus, e.g., pollutant removal, gas separation and the like. A listing of possible liquids with various effective chemistries is described in U.S. patent application Ser. No. 12/459,685, entitled "Gas liquid contactor and effluent cleaning system and method," filed on Jul. 6, 2009, which is hereby incorporated by reference as if fully set forth herein.

Another aspect of the invention relates to operating the apparatus at a condition that reduces the stability of liquid jets, e.g., a droplet generator apparatus. The apparatus includes nozzles and is generally described with reference to U.S. patent application Ser. No. 12/459,685, entitled "Gas liquid contactor and effluent cleaning system and method," filed on Jul. 6, 2009, which is hereby incorporated by reference as if fully set forth herein. In this embodiment, the apparatus does not include a stability unit as generally described herein.

More specifically, the apparatus is operated under conditions to produce instable jets, rather than stable jets. The instable jets increase at least the mixing of the liquid and gas in the gas liquid contactor. Typically, the surface area of instable jets would be less as compared to stable jets due to the size of the droplets formed as the jets break up. However, as the agitation is increased the mass transfer may increase due to saturation, especially when the apparatus is operated with fluids having a high mass transfer coefficient. Therefore, it may be beneficial to operate the apparatus and/or design the apparatus to operate as a droplet generator for some applications.

A preferred embodiment is directed towards a method of processing gas phase molecules with a gas liquid contactor. The method includes forming a plurality of instable liquid jets including a distribution of drops from an array of nozzles. The method includes providing gas with at least one reactive or soluble gas phase molecule and removing at least a portion of the gas phase molecules by a mass transfer interaction between the gas phase molecules and the distribution of drops.

In an embodiment of the invention, combining operating conditions, e.g., high plenum pressures with tightly packed array of nozzles, leads to collisions between jets that generate a distribution of drops. In a preferred embodiment, the distribution of drops is a dense and substantially uniform distribution. The droplet distribution includes a range of droplet sizes such as droplets in a range from about 50 µm to about 2 mm, and a range of liquid partial volumes between 0.5% and 20%. As the plenum pressure increases the velocity of liquid feeding the nozzles increases; this results in competition for water, which leads to instabilities in the flat jets. The instabilities manifest themselves in the jets in at least two ways. First, there is a pulsing of the jets, both along the same axis of the water flow and in the transverse axis (nozzle to nozzle competition). Jet pulsing results from high plenum flow rates and leads to competition between adjacent nozzles such that the width of a jet may oscillates. The competition can result in a varying the flow rate for an individual nozzle leading to jet pulsing. Second, the development of the linear sheet instability that is present in these types of jets under optimal conditions is also accelerated.

In another embodiment of the invention, the spacing of the jets is such that pulsing, combined with the linear sheet instabilities from each jet, results in collisions between neighboring jets. These collisions lead to the generation of high velocity, e.g., velocities in the range from about 5 m/s to about 10 m/s or greater. The high droplet velocity results from the initial high velocity of the jets at the exit of the nozzles, e.g., velocities in the range from about 5 m/s to about 10 m/s or greater. The large droplet velocity coupled with the droplet size distribution minimizes the effects of external forces on the droplets, such as forces caused by a gas flow or gravity, leaving the overall droplet momentum unchanged. Moreover, the droplet velocity is small enough to provide reaction enhancement due to increased surface area.

In another embodiment of the invention, the droplet generator may be obtained by adjusting at least one of depth of cut (DOC) of the nozzle, nozzle to nozzle spacing, nozzle bank to nozzle bank spacing, operating plenum pressure; using enhancers that decrease surface tension and/or viscosity, and combinations thereof in order amplify the natural jet instabilities. For example, as the depth of cut of the nozzle is decreased the operating pressure to obtain an instability in jet is reduced. Also, as the nozzle to nozzle spacing is decreased the operating pressure to obtain jet instability is also reduced. As the operating plenum pressure is increased the velocity of the jet is increased, and collisions lead to instability of the jets. Enhancers that decrease surface tension tend to widen jets and therefore tend increase jet-jet collisions and to amplify the natural jet instabilities. Finally, enhancers that decrease viscosity tend to increase the susceptibility of the fluid to being deformed jets and therefore tend to amplify the natural jet instabilities In a preferred embodiment, a gas liquid contactor includes a nozzle array having nozzles with a 0.52 DOC, nozzle to nozzle spacing of about 2 mm, nozzle bank to nozzle bank spacing of about 2 cm, and no stability unit. The gas liquid contactor and nozzle are further described with reference to U.S. patent application Ser. No. 12/459,685, entitled "Gas liquid contactor and effluent cleaning system and method," filed on Jul. 6, 2009, which is hereby incorporated by reference as if fully set forth herein. The gas liquid contactor is operated at a plenum pressure of 15 psi or greater to produce instable jets that break up. Preferably, operating at a plenum pressure in a range from about 17 psi to about 75 psi and more preferably operating in a plenum pressure range of about 17 psi to about 30 psi.

In another preferred embodiment, a gas liquid contactor includes a nozzle array having nozzles with a 0.54 DOC, nozzle to nozzle spacing of about 2 mm, nozzle bank to nozzle bank spacing of about 2 cm, and no stability unit. The gas liquid contactor is further described with reference to U.S. patent application Ser. No. 12/459,685, entitled "Gas liquid contactor and effluent cleaning system and method," filed on Jul. 6, 2009, which is hereby incorporated by reference as if fully set forth herein. The gas liquid contactor is operated at a plenum pressure of 13 psi or greater to produce instable jets that break up. Preferably, operating at a plenum pressure in a range from about 15 psi to about 73 psi and more preferably operating in a plenum pressure range of about 15 psi to about 28 psi.

In still another preferred embodiment, a gas liquid contactor includes a nozzle array having nozzles with a 0.56 DOC, nozzle to nozzle spacing of about 2 mm, nozzle bank to nozzle bank spacing of about 2 cm and no stability unit. The gas liquid contactor is further described with reference to U.S. patent application Ser. No. 12/459,685, entitled "Gas liquid contactor and effluent cleaning system and method," filed on Jul. 6, 2009, which is hereby incorporated by reference as if fully set forth herein. The gas liquid contactor is operated at a plenum pressure of 11 psi or greater to produce instable jets that break up. Preferably, operating at a plenum pressure in a range from about 11 psi to about 71 psi and more preferably operating in a plenum pressure range of about 13 psi to about 26 psi.

Therefore, as the DOC of the nozzle increases, i.e., the nozzle dimensions are increased, the amount of plenum pressure required to produce instability in the jets also decreases. This is due to the increased velocity of the fluid through the nozzles as the DOC increases or the nozzle size increases.

In another embodiment of the invention, the gas phase molecules include at least one of sulfur oxides, nitrogen oxides, carbon dioxide, ammonia, acid gases, amines, halogens, reduced sulfur compounds, and oxygen. In a preferred embodiment, the gas phase molecules comprise sulfur oxides. In a more preferred embodiment, the gas phase molecules comprise carbon dioxide. The distribution of drops include ammonia, ammonium salts, amines, alkanolamines, alkali salts, alkaline earth salts, peroxides, hypochlorites and combinations thereof. Of course other gas phase molecules and/or liquids may be used as described in U.S. patent application Ser. No. 12/459,685, entitled "Gas liquid contactor and effluent cleaning system and method," filed on Jul. 6, 2009, which is hereby incorporated by reference as if fully set forth herein.

In another embodiment of the invention, jets are formed in the gas liquid contactor when an aqueous slurry is used as the liquid and passes through the nozzles. The jets formed with the slurry are stable and essentially planar liquid jets, each of said jets includes a planar sheet of liquid, where the plurality of liquid jets are arranged in substantially parallel planes.

The gas liquid contactor is described herein or is described as set forth in U.S. patent application Ser. No. 12/459,685, entitled "Gas liquid contactor and effluent cleaning system and method," filed on Jul. 6, 2009, which is hereby incorporated by reference as if fully set forth herein. That gas liquid contactor may also include a stability unit and/or an enhancer(s).

Depending on the application of the gas liquid contactor, the presence of solids may be necessary in order to optimize the chemical reaction and/or the solids may be formed as a by-product of the chemical reaction. The slurry is an aqueous solution that may include a solid concentration in a range from about 0.01% (w/w) to about 40% (w/w), which may be necessary to validate jet characteristics when solids are introduced into the gas-liquid contactor on a case by case basis. In a preferred embodiment, the slurry includes a solid composition in a range from about 0.2% (w/w) to about 30% (w/w). Examples 10-12 examine solids present in solution that have been passed through the nozzles. These cases range in solid concentration from 0.2% (w/w) up to 30% (w/w). As long as the solids are not given adequate time to aggregate or settle, there have been no problems passing them through the nozzles.

In another embodiment, various modifications to the nozzle dimensions or operating conditions may be made. These modifications may be made depending on what effect the slurry has on the jet characteristics, such as the case where the solids act to disrupt the surface tension of the liquid. For example, decreasing a major axis of the nozzle would combat the effect of expanded jets caused by the disruption in surface tension. Also, decreasing the plenum pressure would also combat the effect of expanded jets caused by the disruption in surface tension.

Another embodiment of the invention is directed towards a method of separating at least two fluids with an apparatus. The apparatus in this embodiment is described herein and with reference to U.S. patent application Ser. No. 12/459,685, entitled "Gas liquid contactor and effluent cleaning system and method," filed on Jul. 6, 2009, which is hereby incorporated by reference as if fully set forth herein. The apparatus is used as a distillation column. The method includes heating at least one of the at least two fluids to a vapor pressure of the at least one of the at least two fluids. The heating can take place in a catch tank, e.g., with a heat exchanger. Next, a plurality of essentially planar liquid jets is formed to remove at least a portion of at least one of the at least two fluids. The liquid jets include a substantially planar sheet of liquid and are arranged in substantially parallel planes. To increase separation of the two fluids additional equilibrium stages can be added for modular scaling. For example, the modularity of the apparatus is discussed in U.S. patent application Ser. No. 12/459,685, entitled "Gas liquid contactor and effluent cleaning system and method," filed on Jul. 6, 2009, which is hereby incorporated by reference as if fully set forth herein.

In this embodiment, the liquid jets may be formed as flat liquid jets having a thickness in a range from about 10 µm to about 1000 µm, in a preferred embodiment, the thickness is in a range from about 10 µm to about 250 µm. The flat liquid jets may have a length in a range from about 5 cm to about 30 cm, more preferably a length in a range from about 5 cm to about 20 cm. At least one of the flat liquid jets in the array has a velocity less than 15 m/sec exiting a nozzle and more preferably, is a range from about 5 m/sec to about 10 m/sec.

In this embodiment, the at least two fluids may include any fluids that are capable of being separated based on there respective thermodynamic properties, e.g., vapor pressure, as known in the art. The fluids may be contain a liquid, gas, and/or solid particulates. The fluids may include paper and pulping condensates, municipal and industrial wastewaters, chemical processes and pharmaceutical byproduct streams In one embodiment, the fluids may also include a carbonate and an aqueous carbonate. The fluids may include a variety of different materials such as cationic, alkyl, aryl carbamates, alkali, alkaline earth metal, ammonium carbamate, ammonium carbonate salts and combinations thereof. The fluids may include an alcohol, ammonia, water, sea water, brine, sour water, reduced sulfur and organic sulfur-containing compounds, volatile organic compounds (VOC), and combinations thereof.

Reference will now be made in detail to an embodiment of the present invention, an example of which is illustrated in the accompanying drawings.

FIG. 1 is a block diagram of a system for producing a flat jet according to an embodiment of the invention.

Referring to FIG. 1, a gas liquid contactor is generally depicted as reference number 100. The gas liquid contactor includes a liquid inlet and a gas inlet. The gas liquid contactor is generally depicted as reference number 100. In this embodiment, a cross flow configuration is utilized, the gas flows from left to right through the contactor 100. Liquid enters the top 102 of the contactor 100 through inlet plenum 104 and is forced through the nozzle plates 106 at the top of the contact chamber 108. In this embodiment, a stability unit is coupled to the nozzle plate and configured to reduce instability of jets formed from the gas liquid contactor.

Substantially stable flat liquid jets are formed by the nozzles and flow down through the chamber. The gas flows from left to right in the system depicted in FIG. 1 between the parallel jets, where the mass transfer takes place, then through the low pressure drop mist eliminator 110, and on to the exit 112 from the entrance 113. The liquid is collected through an anti splash grid 112 at the bottom of the contactor, treated as necessary, and possibly recycled. The anti splash grid submodule 112 is a grid with apertures shaped to receive the flat jets. The anti splash guard or gas fluid separator is also configured to substantially minimize back-splash of liquid in operation. The apertures of the anti splash grid 112 may be angled slightly towards the exits 114 and/or 116 of the liquid capture outlet plenum 118 to aid in the exit of the fluid without the application of pressure to the fluid. The apparatus may include various modules and the nozzles are described with reference to U.S. patent application Ser. No. 12/459,685, entitled "Gas liquid contactor and effluent cleaning system and method," filed on Jul. 6, 2009, which is hereby incorporated by reference as if fully set forth herein.

Figure 2A:
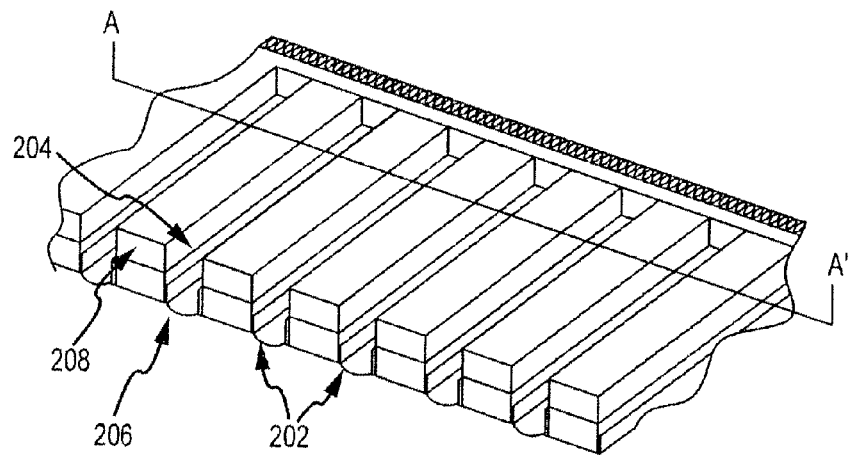
FIG. 2A illustrates a perspective view of a nozzle with a feed channel according to another embodiment of the invention.
Figure 2B:
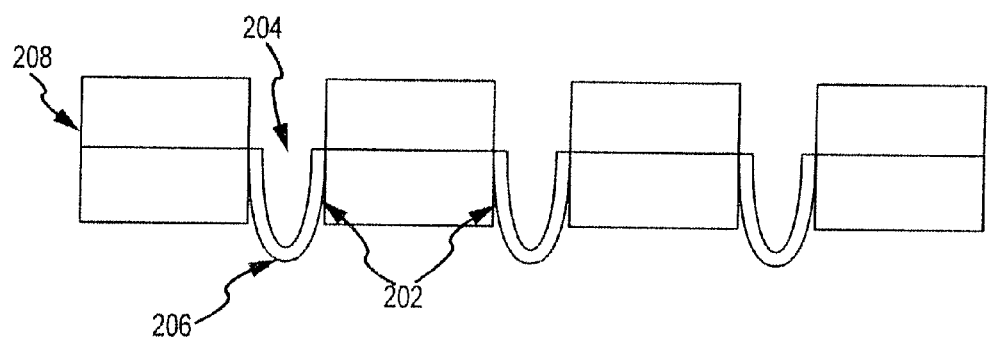
FIG. 2B illustrates a cross-sectional view of a nozzle with a feed channel according to FIG. 2A along A to A'.
Figure 2C:
FIG. 2C illustrates a top down view of a nozzle with a feed channel according to of FIG. 2A.
Figure 2C:
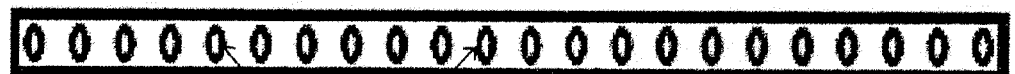

FIG. 2A illustrates a perspective view of a nozzle with a feed channel according to another embodiment of the invention. FIG. 2B illustrates a cross-sectional view of a nozzle with a feed channel according to FIG. 2A along line A to A'. FIG. 2C illustrates a top down view of a nozzle with a feed channel according to of FIG. 2A.

Referring to FIGS. 2A-2C, a nozzle plate is generally depicted as reference number 200. The nozzle plate 200 includes an array of nozzles 202 having an entrance 204 and an exit 206. The nozzles are described in detail with reference to U.S. patent application Ser. No. 12/459,685, entitled "Gas liquid contactor and effluent cleaning system and method," filed on Jul. 6, 2009, which is hereby incorporated by reference as if fully set forth herein. A feed channel 208 is arranged above each of the nozzles and configured as a stability unit to reduce instability of jets formed from the gas liquid contactor 100.

Figure 2D:
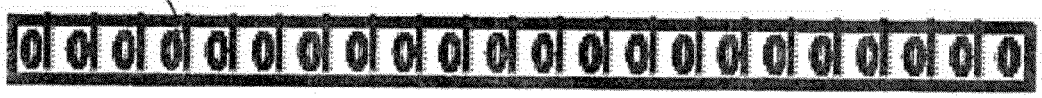
FIG. 2D illustrates a top down view of a nozzle with an individual feed channel according to another embodiment of the invention.
Figure 2D:

FIG. 2D illustrates a top down view of a nozzle with an individual feed channel according to another embodiment of the invention. In this embodiment, each nozzle has its own feed channel as set forth with a cross member 210. Of course other geometric configurations of the nozzle may also be utilized, such as, a feed channel that is configured to surround the circumference of the nozzle opening and extend vertically.

FIG. 3A is a cross-sectional view of a nozzle with a mesh according to another embodiment of the invention. FIG. 3B is a top down view of a nozzle with a mesh according to another embodiment of the invention.

Figure 3C:
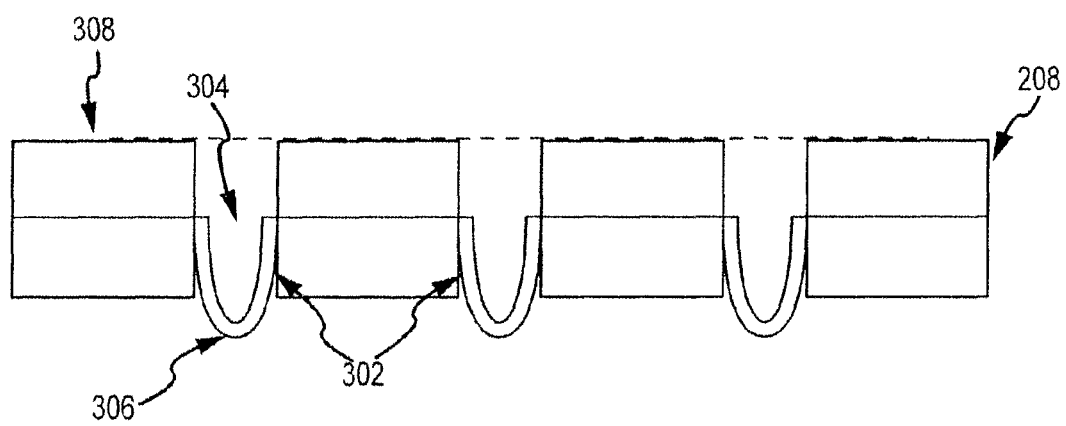
FIG. 3C illustrates a cross-sectional view of a nozzle with a feed channel and a mesh according to another embodiment of the invention.

Referring to FIGS. 3A-3B, a portion of a nozzle plate is generally depicted as reference number 300. The nozzle plate 300 includes an array of nozzles 302 having an entrance 304 and an exit 306. A mesh 308 is arranged above each of the nozzles and configured as a stability unit to reduce instability of jets formed from the gas liquid contactor 100. In this embodiment, the mesh is configured to have substantially uniform spacing. The mesh 308 includes a checkerboard pattern and is constructed from stainless steel. The checkerboard pattern includes an opening having a height of about 0.76 mm and a width of about 0.76 mm. As shown in FIG. 3B the mesh 308 appears as discolored region over the nozzle plate 300. In another embodiment of the invention, the mesh 308 may be configured with a feed channel 208 as shown in FIG. 3C.

FIG. 4A is a cross-sectional view of a nozzle with a diverter unit according to another embodiment of the invention.

Referring to FIG. 4A, a portion of a nozzle plate is generally depicted as reference number 400. The nozzle plate 400 includes an array of nozzles 402 having an entrance 404 and an exit 406. A stability unit 408 is arranged above each of the nozzles and configured as a stability unit to reduce instability of jets formed from the gas liquid contactor 100. In this embodiment, the diverter unit includes a vane at an angle 410 in a range from about 30 degrees to about 60 degrees.

FIG. 4B illustrates a perspective view of a nozzle with a diverter unit, feed channel and mesh according to another embodiment of the invention. FIG. 4C illustrates a cross-sectional view of the nozzle in FIG. 4B along line B to B'.

Referring to FIGS. 4B-4C, a portion of the nozzle plate is generally depicted as reference number 416. The stability unit in this embodiment includes a feed channel 208, mesh 308, and a vane 408 of a diverter unit as shown in FIG. 4C. Of course, the vane 408 may be configured in the opposite direction where the flow of fluid is from left to right rather than from right to left.

Figure 4D:
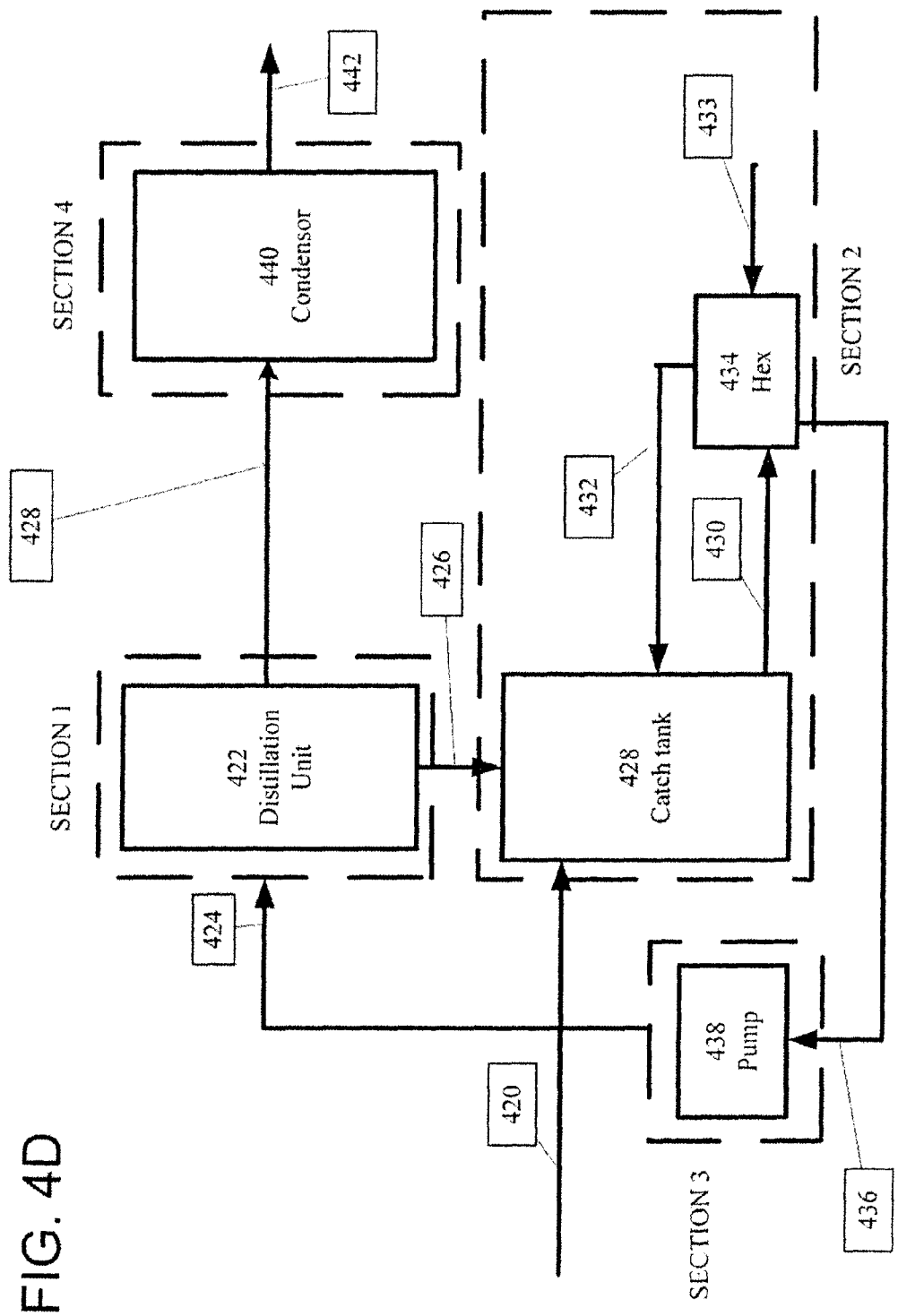
FIG. 4D illustrates a block diagram of a distillation system according to another embodiment of the invention.

FIG. 4D illustrates a block diagram of a distillation system according to an embodiment of the invention. In this embodiment, a traditional distillation process to separate two or more components in a liquid mixture is described with reference to three Sections. In addition, the liquid mixture in this embodiment can be derived from petroleum refining, food and beverage, pharmaceutical, biotechnology, chemical processing, petrochemicals, fossil fuel power plant and natural gas unit operations.

Section 1 includes a distillation unit 422, a liquid inlet 424, a liquid outlet 426 and gas or vapor outlet 428. The distillation unit 422 is operated at conditions for separating two or more chemicals in a feed stock by their vapor pressure through the application or removal of heat. That is, the thermodynamic distillation mechanism is known in the art. The distillation unit 422 includes an array of densely packed high surface area flat jets for enhanced mass transfer between vapor and liquid as discussed with reference to U.S. patent application Ser. No. 12/459,685, entitled "Gas liquid contactor and effluent cleaning system and method," filed on Jul. 6, 2009, which is hereby incorporated by reference as if fully set forth herein. Vapor stream 428 exits distiller 422 to condenser 440. The liquid outlet 426 flows out of the distillation unit 422 (Section 1) into a catch tank 428 (Section 2) where the liquid is heated to raise the vapor pressure of the components through a heat exchanger, e.g., a reboiler.

Section 2 is a catch tank 428 fitted with a heat exchanger 434. Referring to Section 2, the catch tank 428 includes a feed inlet 420, a feed outlet 430 to heat exchanger 434, a feed return 432 from heat exchanger and a liquid inlet 426 from Section 1. Feed outlet 430 is sent to a heat exchanger 434 to raise the temperature and vapor pressure of the feed where it is returned 432 and recirculated through catch tank 428. Energy input 433 to heat exchanger 434 can be in the form of steam, electrical or other forms as known in the art.

Section 3 is a liquid pump 438. Referring to Section 3, the liquid pump 438 has a liquid inlet 436 and a liquid outlet 424. The liquid pump recirculates the feed solution from Section 2 to Section 1.

Section 4 is a condenser 440. Referring to Section 4, vapor stream 428 created in Section 1 is condensed and collected as a product in stream 422.

Figure 4E:
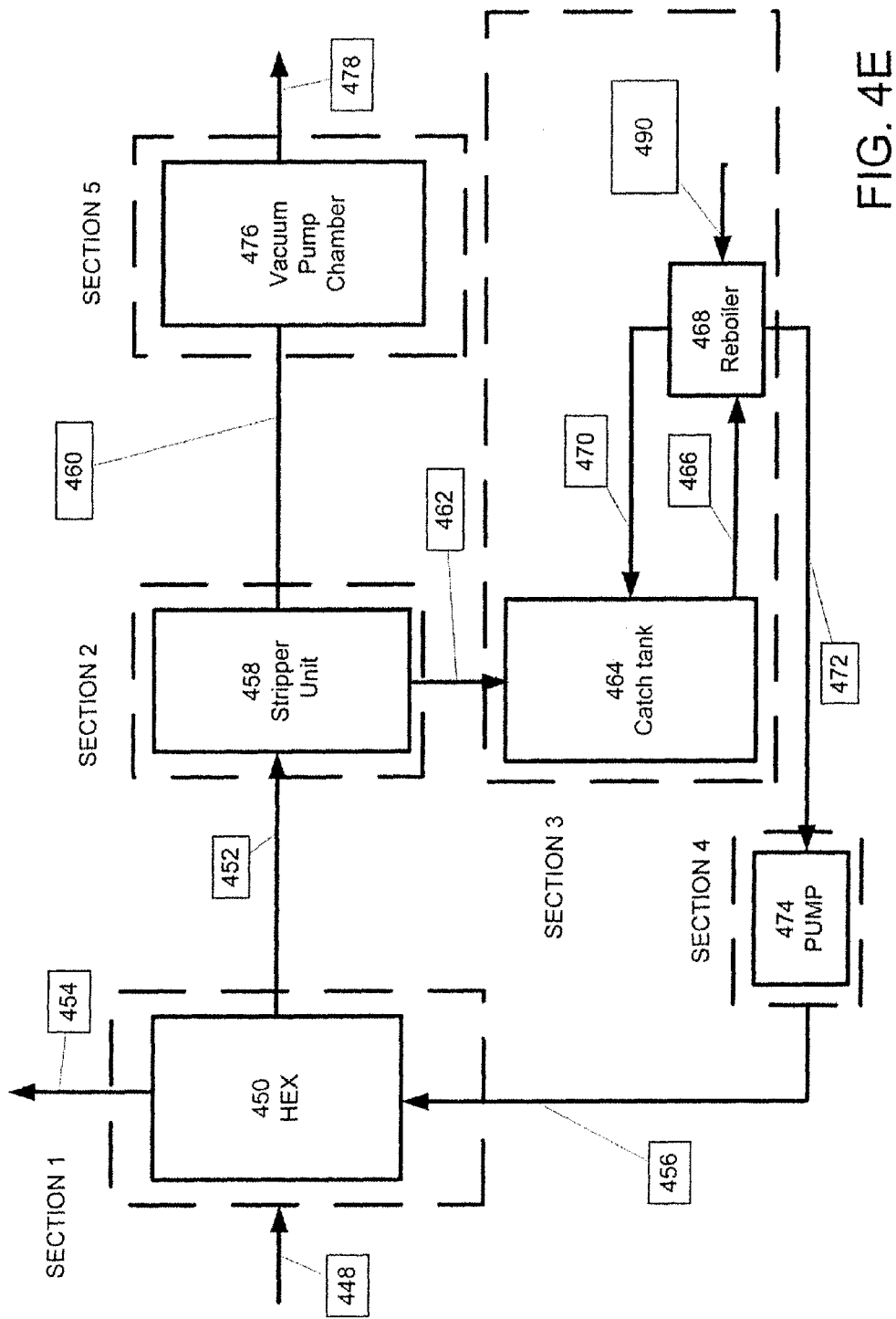
FIG. 4E illustrates a block diagram of a distillation system according to another embodiment of the invention.

FIG. 4E illustrates a block diagram of a distillation system according to another embodiment of the invention. In this embodiment, the distillation process is described in the context of solvent regeneration and product gas stripping and recovery from a unit operation. In this embodiment, the stripping process is described with reference to five Sections.

Section 1 is a rich/lean solvent heat exchanger. Referring to Section 1, the heat exchanger 450 includes stream inlets 448 and 456, and stream outlets 452 and 454. A product stream 448 from a unit operation containing a rich solvent loaded with recoverable gas is passed through heat exchanger 450 and into outlet stream 452. An inlet return stream 456 containing lean solvent with removed gas product from Sections 2 and 3 is passed into heat exchanger 450 and into outlet stream 454 for reuse in a processing unit.

Section 2 is a stripper unit. Referring to Section 2, the stripper unit 458 includes a feed inlet 452, a feed outlet 462 and a vapor outlet 460. Feed outlet 462 is sent to a catch tank 464 in Section 3. The stripper unit 458 includes an array of densely packed high surface area flat jets for enhanced mass transfer between vapor and liquid as discussed with reference to U.S. patent application Ser. No. 12/459,685, entitled "Gas liquid contactor and effluent cleaning system and method," filed on Jul. 6, 2009, which is hereby incorporated by reference as if fully set forth herein. In this manner, we would expect substantial improvement in the regeneration performance using our flat jet system due to significantly reduced diffusion distance, a constant renewal of the jet surface and small jet exposure time. Vapor product stream 460 exits stripper 458 to vacuum pump 476. The liquid jet outlet 462 flows into a catch tank 464 in Section 3.

Section 3 is catch tank fitted with a reboiler. Referring to Section 3, the catch tank 464 includes a feed inlet 462 from Section 2, a feed outlet 466 to reboiler 468, a feed return 470 from the reboiler. The reboiler 468 includes an energy input 490 in the form of steam or other heat additions, to heat the rich solvent to create a vapor stream. Solvent vapor generated in bottom of the catch tank by the reboiler 468 serves as a stripping vapor that rises up countercurrently to the down flowing flat jet solvent flow 462 from Section 2. The reboiler 468 also includes a lean solvent output stream 472 to Section 4.

Section 4 is a liquid pump. Referring to Section 4, the liquid pump includes a regenerated (lean) liquid inlet 472 from Section 3 and a liquid outlet 456. The lean liquid output 456 is recirculated back to the heat exchanger 450 in Section 1.

Section 5 is vacuum pump. Referring to Section 5, the vacuum pump includes an inlet vapor flow 460 from the Section 2 and an outlet vapor stream 478. The vacuum pump serves to reduce the pressure above the liquid flat jets in Section 2 for lower solvent temperature and equivalent work of stripping the gas from the rich solvent in Section 3. The outlet vapor stream 478 can be collected and utilized for industrial applications as needed.

EXAMPLES

Example 1

In Example 1, a single jet test apparatus was utilized to illustrate how water exists a nozzle under normal operating conditions. The apparatus is described with reference to FIGS. 5A-5C.

Figure 5A:
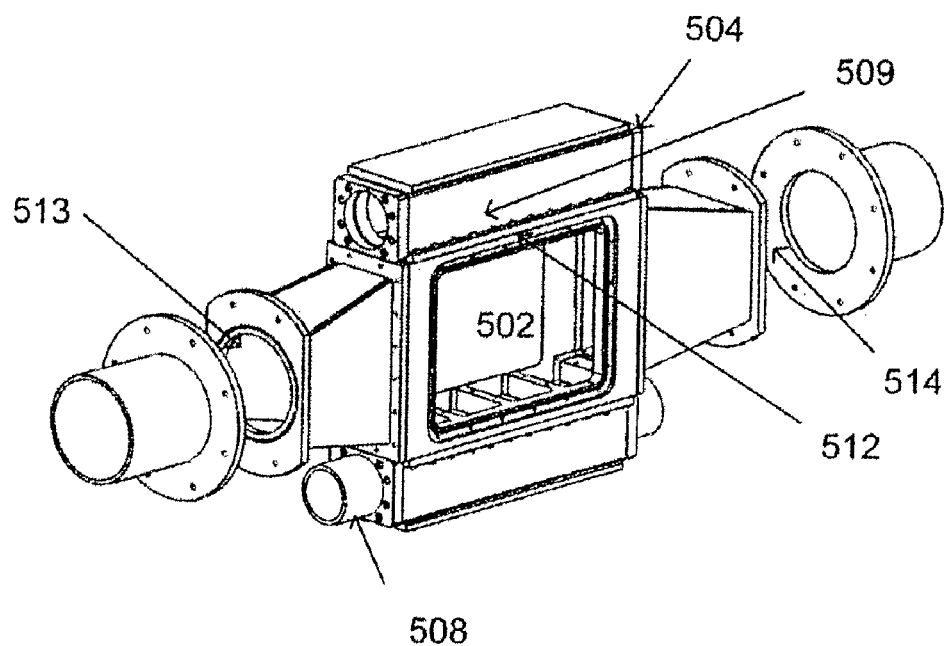
FIG. 5A illustrates an apparatus used in Example 1.
Figure 5B:
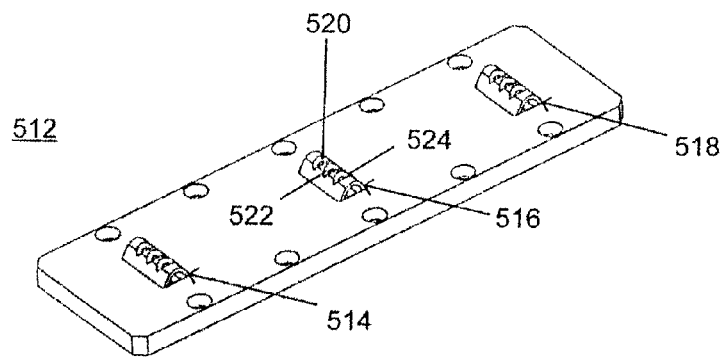
FIG. 5B illustrates an exit side of a nozzle plate used in Example 1.
Figure 5C:
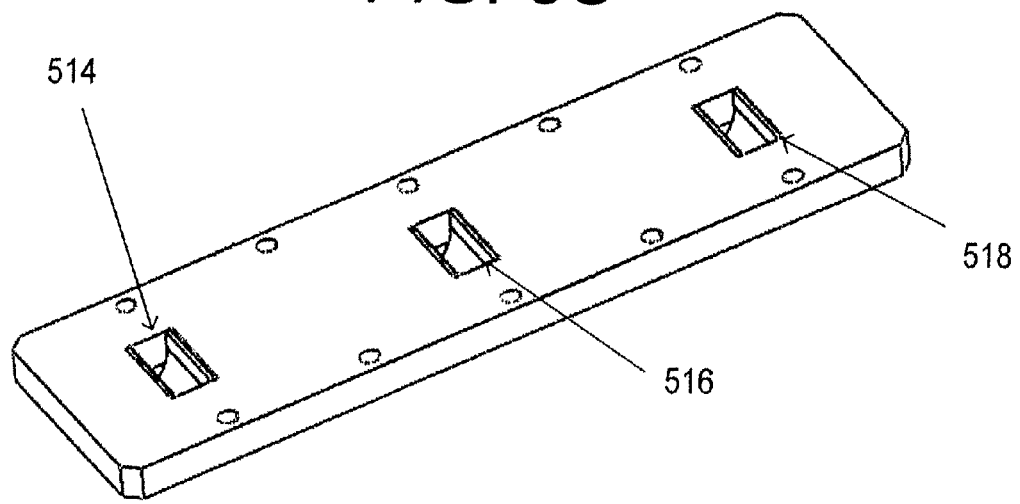
FIG. 5C illustrates an entrance side of a nozzle plate used in Example 1.

Referring to FIGS. 5A-5C, the apparatus is generally depicted as reference number 500 and includes an operating chamber 502, a liquid inlet 504, a fluid exit 508, a gas inlet 513 and gas exit 514. The fluid exit 508 is connected to a recirculation loop and coupled to a pump (not shown) and the fluid inlet 504. A pressure gauge (not shown) is mounted for measuring fluid pressure in a plenum 509 above a nozzle plate 512. The plenum is a sealed chamber formed above the plate 512 and has dimensions of 226 mm wide by 28.5 mm tall by 20 mm deep. The nozzle plate 512 includes three nozzle banks 514, 516, and 518. In this configuration each nozzle bank includes three nozzles. In particular, nozzle bank 516 includes a first nozzle 520, a second nozzle 522, and a third nozzle 524. Each nozzle is separated by a uniform distance—the distance between the first nozzle 520 and the second nozzle 522 is 4 mm. The distance between the nozzle banks 514, 516, and 518 is uniform. In this Example, the distance between nozzle bank 514 and nozzle bank 516 is about 5 cm.

Each nozzle (520, 522, 524) was formed by cutting a 0.056 inch depth of cut (DOC) into a tube (not shown). The tube was then cut and laser welded into a plate thereby forming the plate of nozzle banks. The tube was stainless steel material having a thickness of 0.90 mm. The nozzle plate was stainless steel material having a thickness of 4.72 mm. Each nozzle is also formed to have a major and minor axis of 2.67 mm and 1.2 mm, respectively. In this Example, nozzle bank 514 and nozzle bank 518 were plugged by filling with a bead of wax, i.e., a high melting point parafin. In addition, in nozzle bank 516, nozzles 520 and 524 were also filled with the same wax material, thereby leaving only one nozzle 522 operational. The plate 512 was then positioned in the apparatus 500 as shown in FIG. 5A. The liquid plenum 509 is arranged above the plate 512 and liquid is configured to flow substantially horizontally across the plate 512. The area ratio between the opening of the nozzle 522 and the liquid plenum is about 1:350.

Figure 5D:
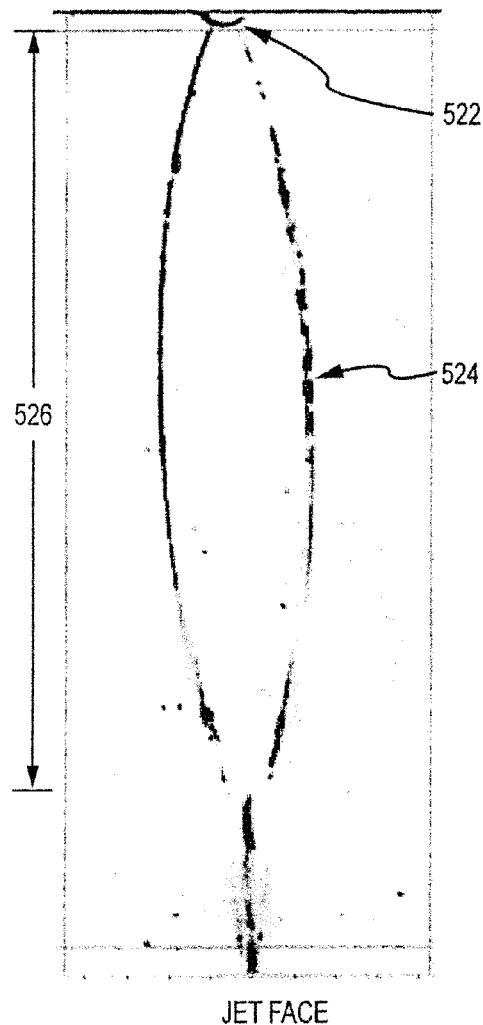
FIG. 5D is a photograph of a front view of a jet formed in Example 1.
Figure 5E:
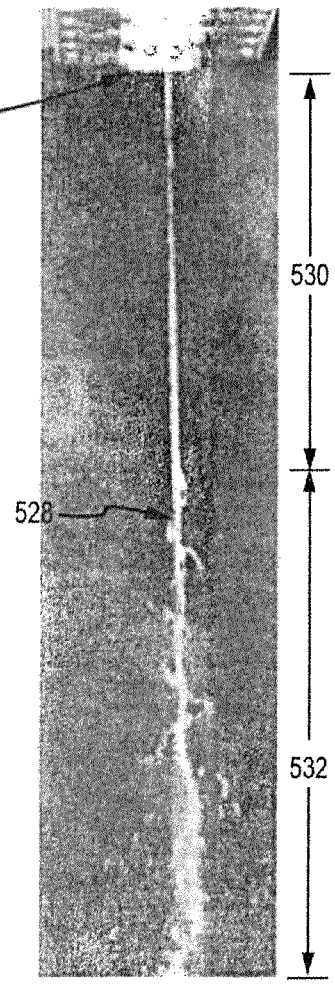
FIG. 5E is a photograph of a side view of a jet formed in Example 1.

In operation, the liquid inlet 504 was used to provide tap water at ambient conditions to the plenum 509. The pressure gauge had a reading of about 7 psi indicating pressure in the plenum 509. FIG. 5D is a photograph of a face of a jet formed in Example 1. FIG. 5E is a photograph of a side view of the jet formed in Example 1.

Now referring to FIGS. 5D and 5E, the water exits the nozzle 522 and forms a flat jet 524. The jet 524 is formed to a length of about 12 cm. This length is measured as indicated by reference number 526. The length of the jet is measured from the exit of the nozzle to where the jet recombines at the bottom. As shown in section 528, linear sheet instability begins and the jet begins to break up. The breakup length is the point where the jet begins to break up. The stability of the jet is shown by reference number 530. The instability region is indicated by reference number 532 and becomes important when multiple jets are placed in close proximity as described herein.

Example 2

In Example 2, an array of jets was formed with a test stand apparatus as described in Example 1 with a different nozzle plate. FIG. 6A illustrates an entrance side of a nozzle plate including 24 nozzles used in Example 2. Referring to FIG. 6A, the nozzle plate is generally depicted as reference number 600. The nozzle plate 600 includes three nozzle banks 602, 604, and 606. In this configuration each nozzle bank includes twenty four nozzles. Each nozzle is separated by a uniform distance of about 4 mm. The distance between the nozzle banks is also uniform. In this example, the distance between nozzle banks is about 2 cm. In this Example, two of the nozzle banks, 602 and 604, are blocked off with a high melting point parafin wax. The nozzle banks were formed as described in Example 1 and have 0.056 inch DOC.

Figure 6B:
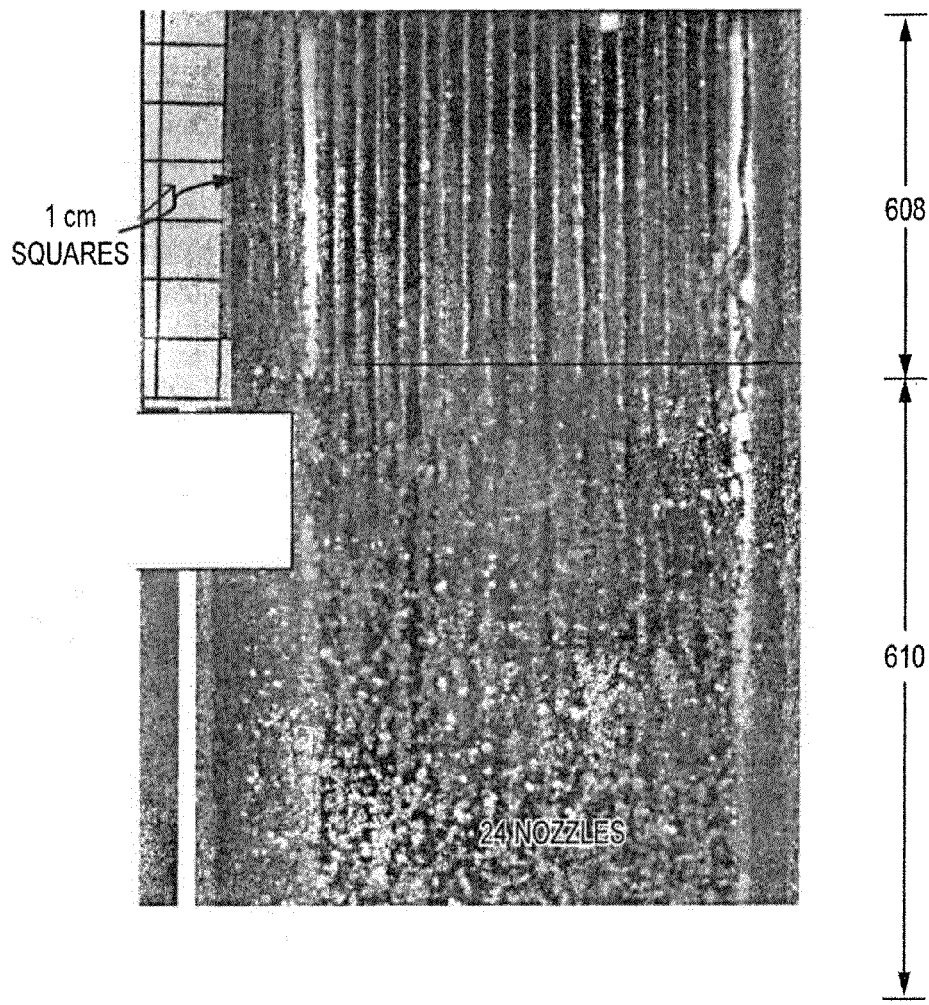
FIG. 6B is a photograph of a side view of jets formed in Example 2.

Referring to FIG. 6B, in operation, a liquid inlet of the apparatus was used to provide tap water at ambient conditions to the liquid plenum. The pressure gauge had a reading of about 7 psi indicating the liquid plenum pressure. The liquid plenum flow rate was about 3 cm/s. As shown in FIG. 6B, the jets formed have two regions, a stable region 608 and an instability region 610. The instability region begins when the jets begin to break up due to jet-jet collisions resulting from the linear sheet instability (as discussed in Example 1 and herein). The distance of region 608 is about 60 mm. Accordingly, the instability region starts at a distance of about 60 mm to about 70 mm. As shown a scale is depicted as 1 cm squares in FIG. 6B. Also, the liquid plenum flow rate was increased from 3 cm/s to about 12 cm/s (7 psi plenum pressure) and the stable jet length was relatively unchanged. Finally, the jets formed in this Example resemble the jets formed in Example 1.

Example 3

In Example 3, an array of jets is formed with a test stand apparatus of Example 2 with a modified nozzle plate of FIG. 6A. In this Example, 72 nozzles were utilized and none of the nozzle banks were blocked. Note that the nozzles in nozzle bank 604 are interlaced with the nozzles in nozzle banks 602 and 606. That is, the nozzles in row 604 are offset from the nozzles in nozzle banks 602 and 606 in order to closely pack the nozzles.

Figure 7:
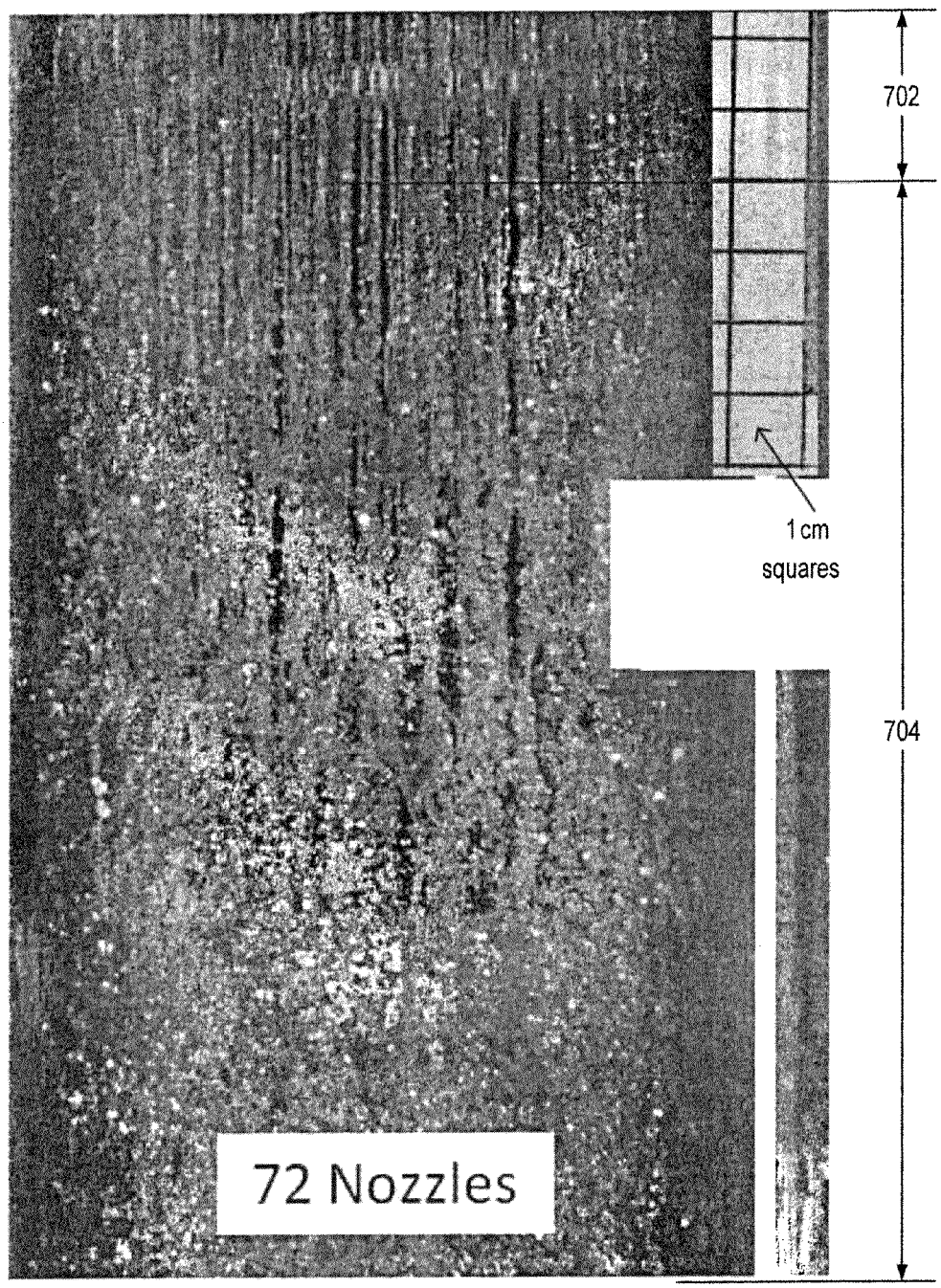
FIG. 7 is a photograph of a side view of jets formed in Example 3.

Referring to FIG. 7, a side image of the jets from the 72 nozzle plates are illustrated. In operation, a liquid inlet was used to provide water at ambient conditions to the liquid plenum. The pressure gauge had a reading of about 7 psi indicating the liquid plenum pressure.

As shown, the jets form a stable region 702 and an instable region 704 in which the jets break up due to jet-jet collisions resulting from the linear sheet instability (as discussed in Example 1). Comparing FIGS. 6B and 7, it is shown that the jets from the 24 nozzles break up at a distance greater from the nozzles than the jets from the 72 nozzles. This is due to the 2 mm jet-to-jet spacing of the interlaced nozzle banks compared to the 4 mm jet-to-jet spacing of a single row.

Example 4

In Example 4, a number of single jets were formed with the apparatus as described in Example 1. In particular, a liquid inlet was used to provide water at ambient conditions to the liquid plenum. The pressure gauge had a reading of about 7 psi.

Five separate runs were conducted using five different fluids including: piperazine and $K_2CO_3$ aqueous solution, $Na_2SO_4$, water, seawater, and glycol as further set forth in Table 2 below.

TABLE 2

| | Fluid/Concentration | Jet Width [mm] | Jet Length [mm] | Breakup Length [mm] |
|---|---|---|---|---|
| Run 1 | Piperazine 1.2 M And 1.8 M $K_2CO_3$ | 27 | 220 | 131 |
| Run 2 | Water | 25 | 217 | 158 |
| Run 3 | $Na_2SO_4$ | 26 | 195 | 146 |
| Run 4 | Sea Water | 26 | 211 | 141 |
| Run 5 | Glycol - [100%] | 35 | N/A | 118 |

Figure 8:
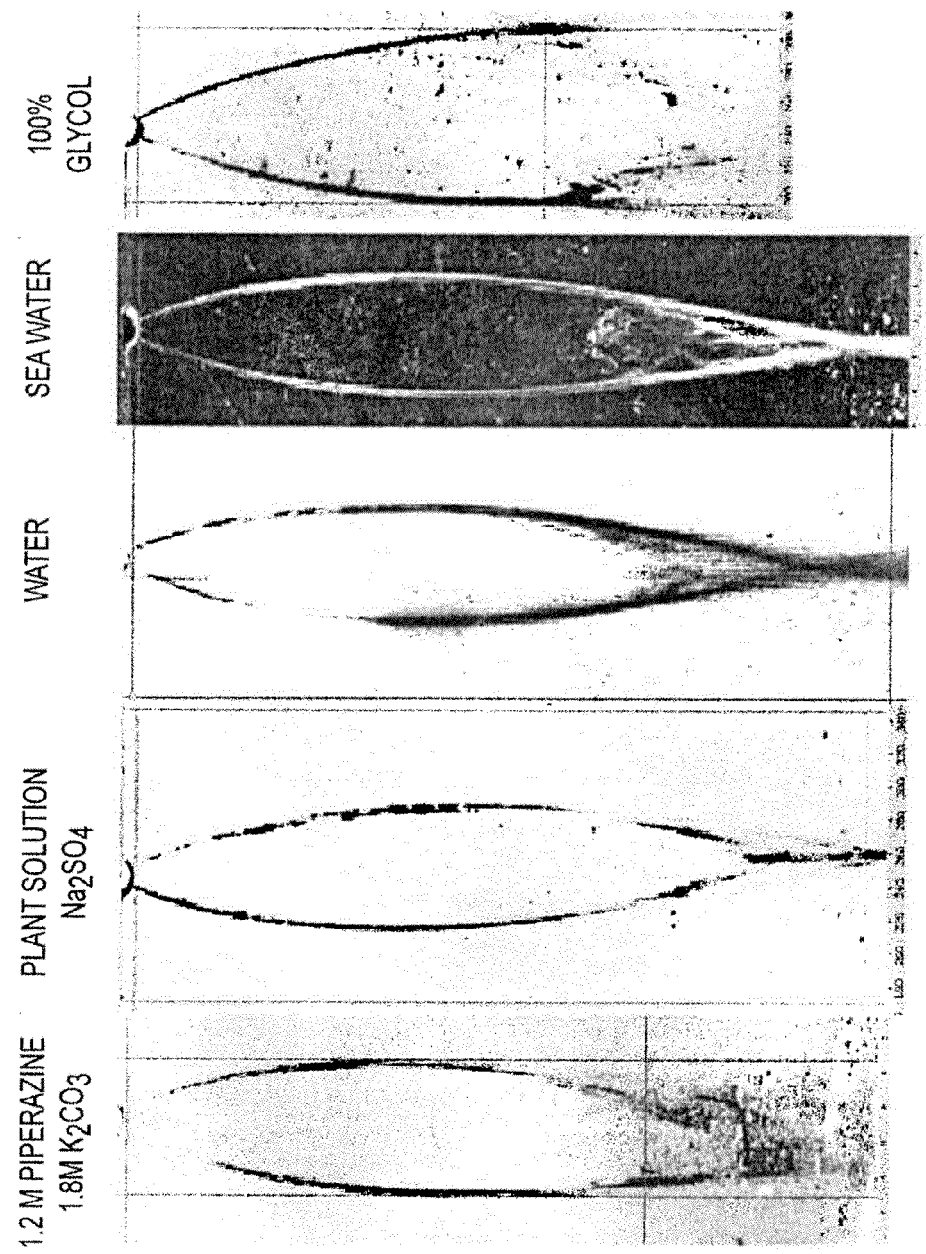
FIG. 8 is a photograph of jets formed by various fluids in Example 4.

The jet width was measured at the widest portion of the jet. The jet length was measured from the nozzle exit to the point where the jet recombined. For jets that did not recombine the length was registered as not available (N/A). The breakup length was measured from the exit of the nozzle to the onset of the linear sheet instability. Referring to FIG. 8 and Table 2 it is shown that fluid composition can also reduce the effect of linear sheet instability.

Comparing piperazine and $K_2CO_3$ aqueous mixture vs. water:

As expected little difference is seen between the piperazine and $K_2CO_3$ mixture and water due to similar properties, e.g., densities, surface tension and viscosity. More particularly, water has a density of 1 g/cm$^3$, a viscosity of $1\times10^{-3}$ kg/m/s, and a surface tension of $73\times10^{-3}$ N/m. 1.2 M piperazine has a density of about 1 g/cm$^3$, a viscosity of $1.6\times10^{-3}$ kg/m/s, and a surface tension of $69\times10^{-3}$ N/m.

Comparing plant solution vs. water:

As expected little difference is seen between the plant solution and water due to similar densities and surface tension.

Comparing sea water vs. water:

As expected little difference is seen between the sea water and water due to similar densities and surface tension. Sea water has a density of about 1.02 g/cm$^3$, a viscosity of about $1\times10^{-3}$ kg/m/s, and a surface tension of about $73\times10^{-3}$ N/m.

Comparing glycol vs water:

Glycol has a density of 1.1 g/cm$^3$, a viscosity of $16\times10^{-3}$ kg/m/s, and a surface tension of $48\times10^{-3}$ N/m. Notice the glycol jets are significantly wider than the water jets at the same picture. This is due to the decreased surface tension of glycol compared to water. The density is 1.1 times larger than water, the viscosity is 16 times larger than water, and the surface tension of glycol is 65% of the surface tension of water. The flat jets produced with glycol are noticeably wider than water at the same plenum pressure. This is due to glycol's smaller surface tension compared to that of water.

In general, the smaller the surface tension the larger the produced jet at a given plenum pressure. Viscosity is the measure of the resistance of a fluid being deformed by either shear stress or extensional stress. As a result, as the viscosity is increased the stability of the jet is increased, see FIG. 8. Additionally, if the fluid density is increased, the amount of energy required to maintain a given oscillation is increased. Therefore, for a constant noise source, increasing the fluid density reduces the linear sheet instability amplitude.

Example 5

In Example 5, a number of single jets were formed with water as the control and with Super-water® enhancer at various plenum pressures with the single jet apparatus of Example 1. In particular, seven separate runs were performed at various plenum pressures as shown in Table 3.

TABLE 3

| | Fluid/Concentration | Jet Width [mm] | Jet Length [mm] | Breakup Length [mm] |
|---|---|---|---|---|
| Run 1-7 psi | Water [100%] | 27 | 214 | 140 |
| Run 2-7 psi | Super-water ® [0.3% by vol.] | 15 | 79 | N/A |
| Run 3-9 psi | Super-water ® [0.3% by vol.] | 19 | 101 | N/A |
| Run 4-12 psi | Super-water ® [0.3% by vol.] | 21 | 121 | N/A |
| Run 5-15 psi | Super-water ® [0.3% by vol.] | 29 | 183 | N/A |
| Run 6-17 psi | Super-water ® [0.3% by vol.] | 32 | 203 | N/A |
| Run 7-18.5 psi | Super-water ® [0.3% by vol.] | 36 | N/A | 140 |

Run 1 was used as a control run and compared to Runs 2-7, which included Super-water®. The molecular weight of Super-water® is between 16 and 18 million. This high molecular weight polymer stabilizes laminator flow and reduces turbulence. Such an enhancer can significantly increase the stability of formed jets.

Figure 9:
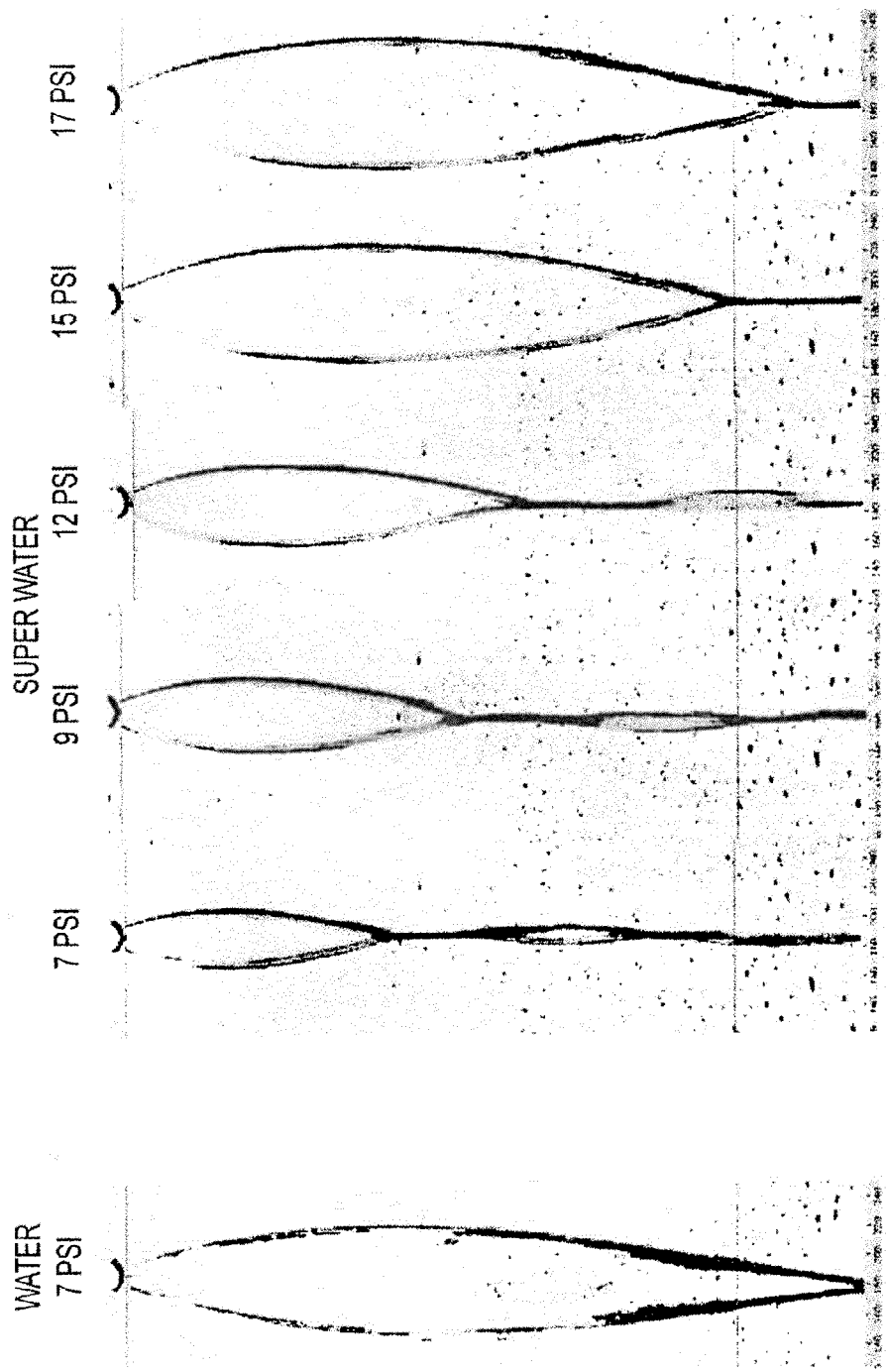
FIG. 9 is a photograph of jets formed by water and Superwater® according to Example 5.

FIG. 9 is photograph of jets formed by water and Super-water® according to Example 5

Referring to FIG. 9 and Table 3, it is shown that as the liquid plenum increases the size of the jets formed increases in both length and width. Therefore, as observed, jet formation also depends on the plenum pressure, surface tension, viscosity, and density.

Example 6

In Example 6, a number of single jets were formed with water and Super-water® as an enhancer at various plenum pressures with the single jet apparatus of Example 1. In particular, separate runs were performed at various plenum pressures as shown in Table 4.

TABLE 4

| | Fluid/Concentration | Jet Width [mm] | Jet Length [mm] | Breakup Length [mm] |
|---|---|---|---|---|
| Run 1-7 PSI | Water [100%] | 27 | 214 | 140 |
| Run 2-7 PSI | Super-water ® [0.15% by vol.] | 25. | 148 | N/A |
| Run 3-9 PSI | Super-water ® [0.15% by vol.] | 35 | 204 | 154 |
| Run 4-11 PSI | Super-water ® [0.15% by vol.] | 43 | 222 | 175 |
| Run 5-9 PSI | Super-water ® [0.075% by vol.] | 36 | N/A | 137 |

Figure 10:
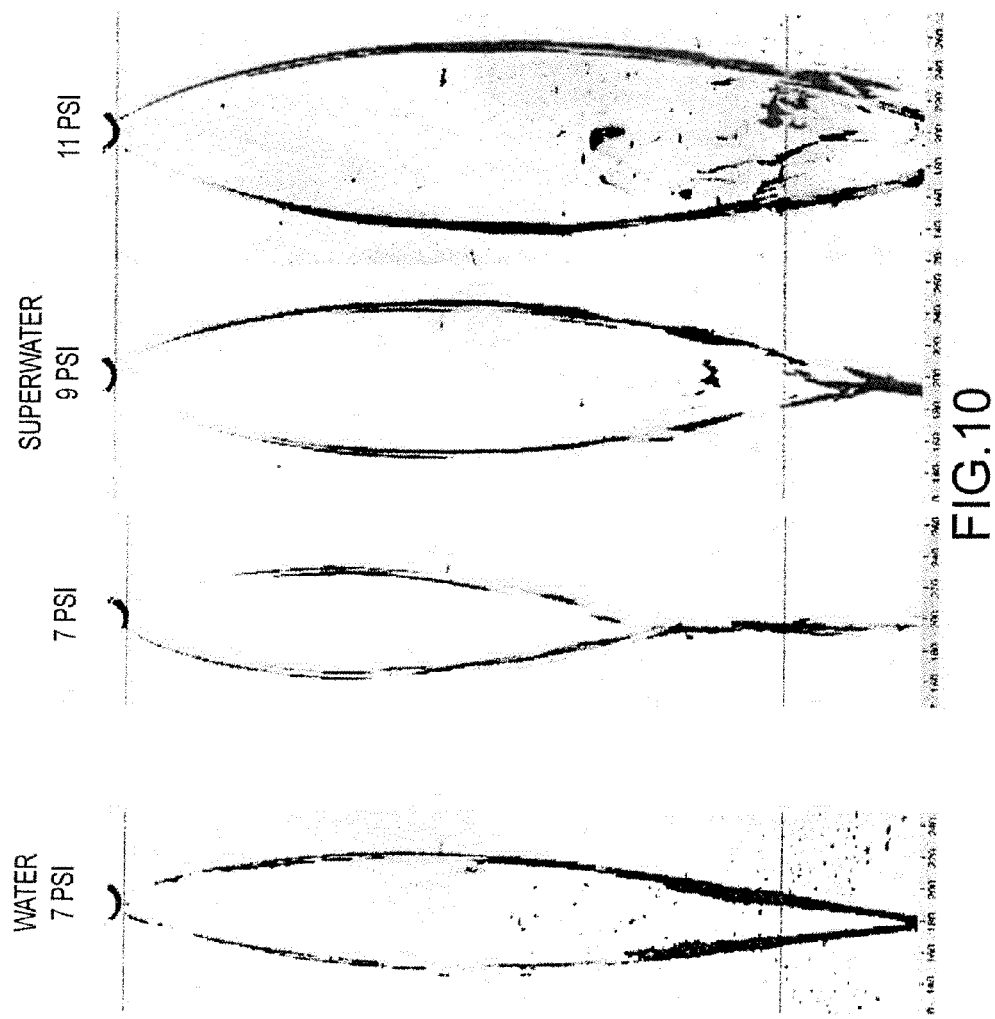
FIG. 10 is a photograph of jets formed by water and Superwater® according to Example 6.
Figure 11:
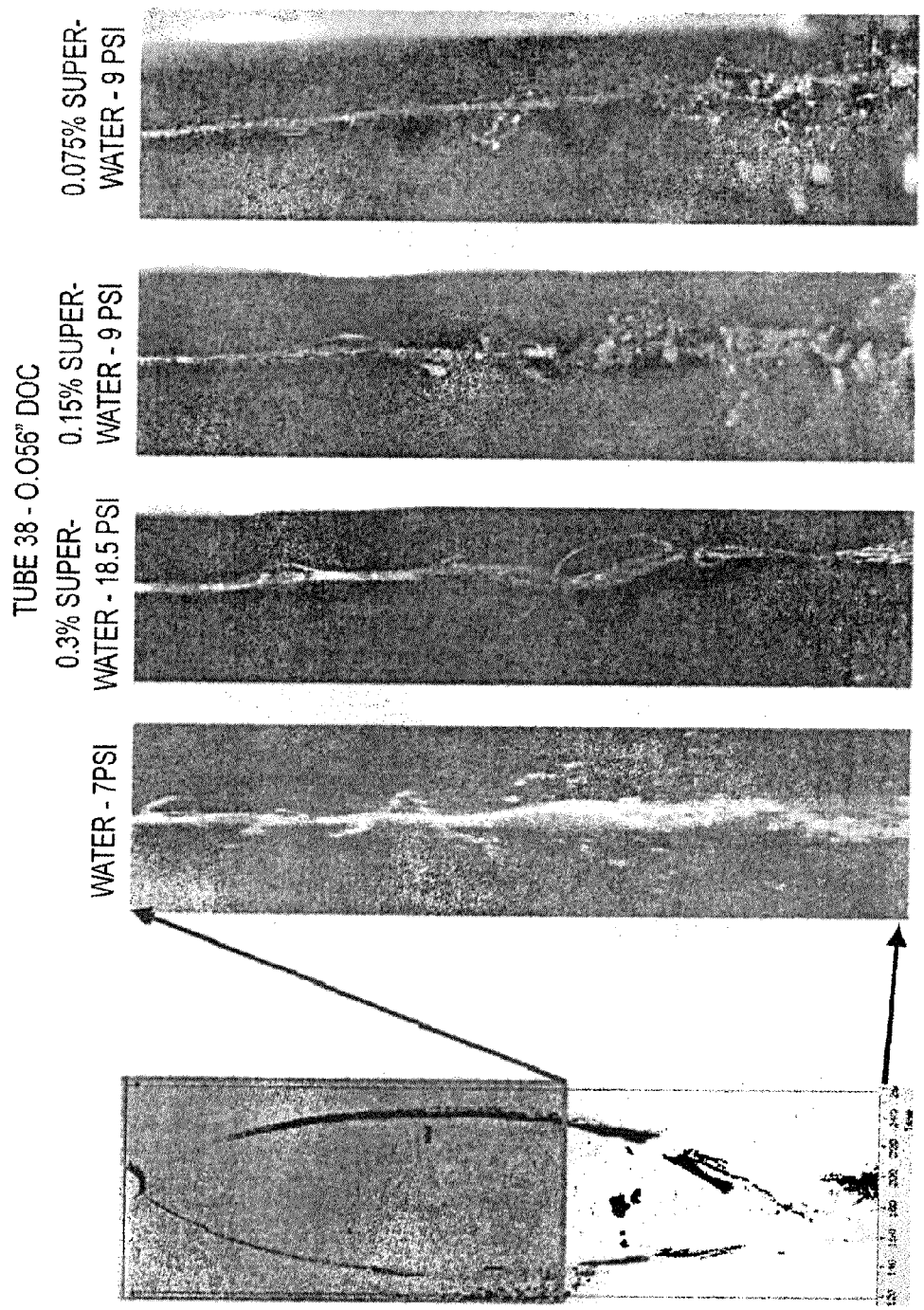
FIG. 11 is a photograph of side views of jets formed in Examples 5 and 6.

Run 1 was used as a control run and compared to Runs 2-5 using Super-water® as an enhancer. Comparing Tables 3 and 4 and FIGS. 9-11, it is shown that less pressure at the liquid plenum is required to form similar sized jets as compared to the previous solution, but with larger surface areas. Also, higher liquid plenum pressures are required for all cases compared to water, however, the formed Super-water® based jets exhibit a higher level of stability. It is also shown that linear sheet instability in the jet depends on the plenum pressure and jet liquid make up. It is important to notice that linear sheet instability is reduced for all Super-water® based solutions.

Water vs. 0.3% Super-water® 18.5 psi:

From FIG. 9 (17 psi case), the formed flat jets are seen to have similar surface areas. The linear sheet instability of the jet formed by Super-water® is significantly less. This is due to the increased viscosity, high molecular weight and stabilizing longitudinal structure of the Super-water®.

Water vs. 0.15% Super-water® 9 psi:

From FIG. 9 (9 psi case), the formed flat jets are seen to have similar surface areas. The linear sheet instability of the jet formed by Super-water® is significantly less. This is due to the increased viscosity, high molecular weight and stabilizing longitudinal structure of the Super-water®.

Water vs. 0.075% Super-water® 9 psi:

Linear sheet instability of the jet formed by Super-water® is less. This is due to the increased viscosity, high molecular weight and stabilizing longitudinal structure of the Super-water®. Slightly larger excursions are seen compared to the flat jets formed with higher concentrations of Super-water®

Example 7

Figure 12A:
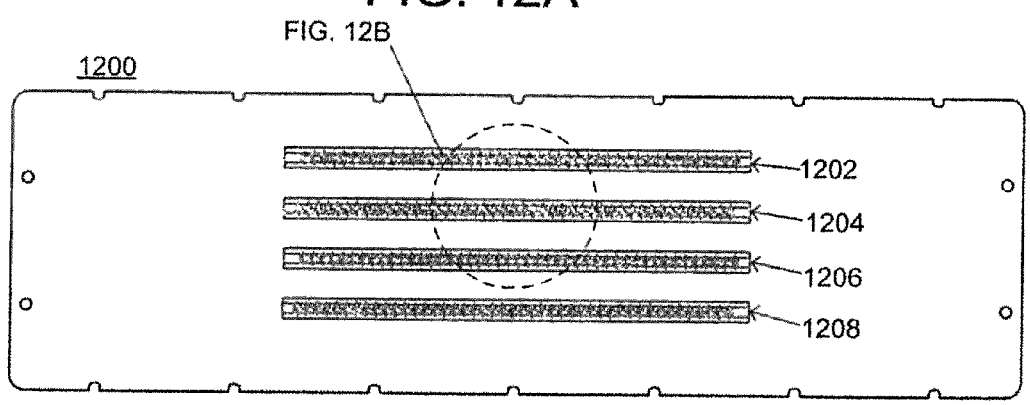
FIG. 12A illustrates an exit side of a nozzle plate used in Example 7.
Figure 12B:
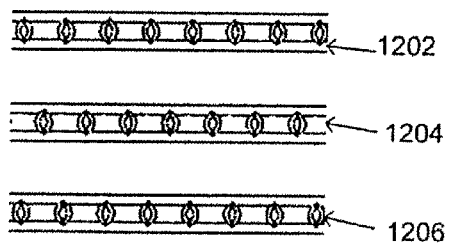
FIG. 12B illustrates a blown-up view of a portion of the nozzle plate of FIG. 12A.

In Example 7, an array of jets was formed with a test stand as described in Example 2. FIG. 12A illustrates a nozzle plate that was used in Example 7. FIG. 12B illustrates a blown-up portion of the nozzle plate of FIG. 12A. The nozzle plate is generally depicted as reference number 1200. The nozzle plate 1200 includes four nozzle banks 1202, 1204, 1206 and 1208. In this configuration each nozzle bank includes 45 nozzles. Each nozzle is separated by a uniform distance of 4 mm. As shown in FIG. 12B, alternating rows of nozzles are interlaced. That is, the nozzles in nozzle bank 1204 are offset from the nozzles in nozzle bank 1202 and 1206. In addition, the nozzles in nozzle bank 1206 are offset from the nozzles in banks 1204 and 1208. The distance between the nozzle banks is also uniform at a distance of 20 mm.

Each nozzle was formed by cutting a 0.056 inch deep hole into a tube (not shown), i.e., 0.056 DOC nozzle. The tube was then cut and laser welded into a plate thereby forming the plate of nozzle banks. The tube was stainless steel material having a thickness of 0.90 mm. The plate was stainless steel material having a thickness of 6.4 mm. Each nozzle was also formed to have a major and minor axis of 2.67 mm and 1.2 mm, respectively.

FIG. 12C shows a honeycomb feed channel structure used in Example 7. The honeycomb feed channel structure is generally depicted as reference number 1210 and includes a plurality of honeycomb shaped vanes having a distance 1214 of 14 mm and a distance 1216 of 7.4 mm. Each block of the honeycomb feed channel structure 1210 has vanes with a height of 15.9 mm. The honeycomb feed channel structure 1210 was attached to the nozzle plate 1200 by RTV silicone adhesive. The honeycomb feed channel 1210 was formed of stainless steel material. This assembled nozzle plate was positioned in the apparatus of FIG. 5A such that a liquid plenum was above the honeycomb structure and water flowed through the honeycomb structure 1210 to enter each nozzle of the nozzle plate 1200.

The apparatus was operated under two conditions. The first condition included supplying water at a pressure of 7 psi without a honeycomb feed channel structure. The second condition included supplying water at a pressure of 7 psi with a honeycomb feed channel structure. Referring now to FIGS. 12D-12E, it is shown that jet formation is greatly improved by utilizing a honeycomb feed channel structure. As shown in FIG. 12D, the flow of the jets formed follows the flow direction of water. As shown in FIG. 12E, the honeycomb feed channel structure is used to reshape the nozzle liquid feed.

This results in vertically formed jets. In addition, the improved nozzle liquid feed reduces the strength of the linear instability leading to improved jet formation.

Example 8

Figure 13A:
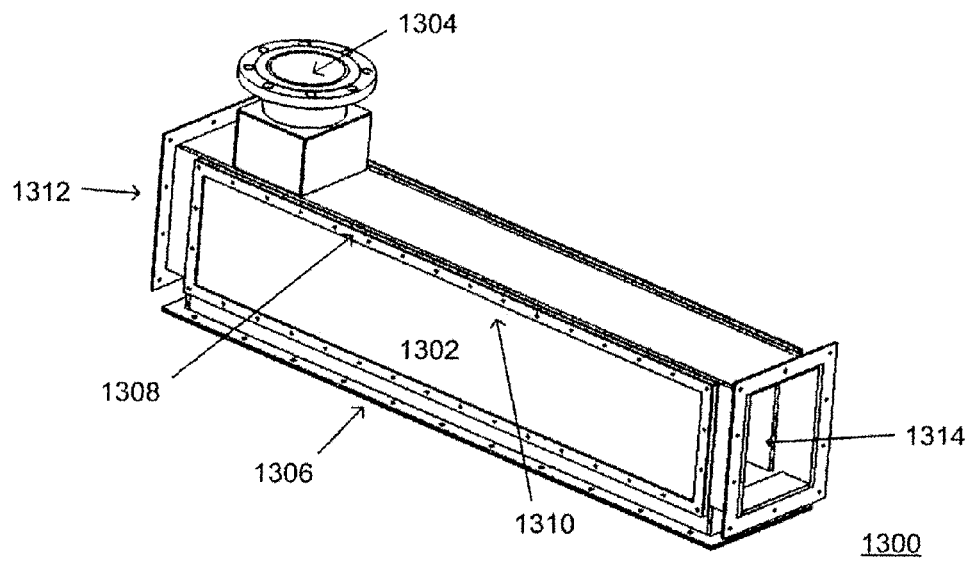
FIG. 13A illustrates an apparatus used in Example 8.

In this Example, an apparatus as shown in FIG. 13A was utilized with two different jet boxes. The first jet box included nozzles with feed channels only. The second jet box included nozzles with feed channels, a mesh, and a diverter unit with vanes at an angle of about 45 degrees.

The apparatus is generally illustrated as reference number 1300. The apparatus 1300 includes a chamber 1302, a liquid inlet 1304, and a liquid outlet 1306. The apparatus 1300 also includes a plenum 1308 above a jet box 1310. The apparatus also includes a gas inlet 1312 and a gas outlet 1314.

Figure 13B:
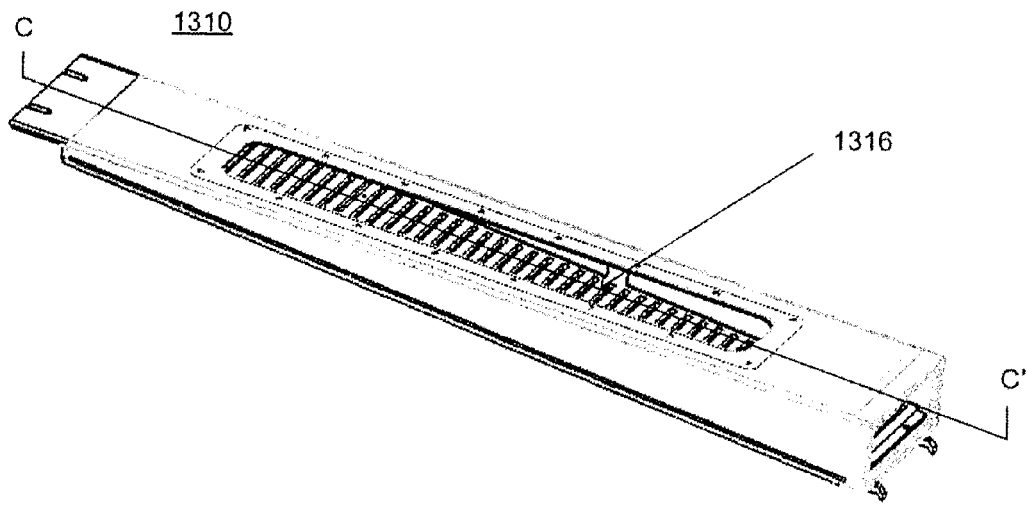
FIG. 13B illustrates a perspective view of a first jet box used in Example 8.
Figure 13C:
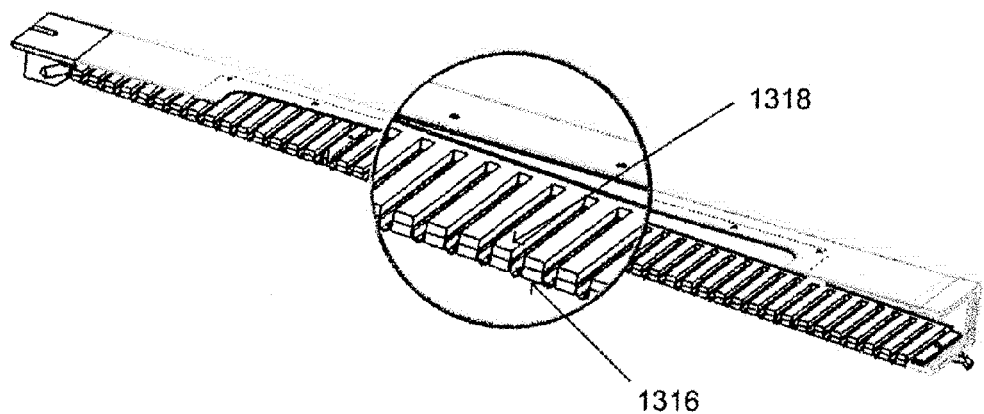
FIG. 13C illustrates a perspective cross-sectional view of the first jet box of FIG. 13B along line C to C'.

The first jet box 1310 is depicted in FIGS. 13B and 13C. The jet box 1310 includes nozzle plate 1316, which includes 50 jet banks. The nozzle plate 1316 includes feed channels 1318 at a height of about 6.4 mm above the nozzles. Also, in this configuration each nozzle bank includes 45 nozzles. The nozzles are separated by a uniform distance of 4 mm. Alternating rows of nozzles are interlaced as described herein. That is, the nozzles in each nozzle bank are offset from the nozzles in adjacent nozzle banks. The distance between the nozzle banks is also uniform at a distance of 20 mm.

Each nozzle was a 0.056 DOC nozzle. The tube was then cut and laser welded into a plate thereby forming the plate of nozzle banks. The tube was stainless steel material having a thickness of 0.90 mm. The plate was stainless steel material having a thickness of 6.4 mm. Each nozzle was also formed to have a major and minor axis of 2.67 mm and 1.2 mm, respectively. In addition, only the center 20 banks were utilized in this Example and the rest were covered with flat rubber gasket material, thereby blocking liquid flow from the covered nozzles (not shown).

Figure 13D:
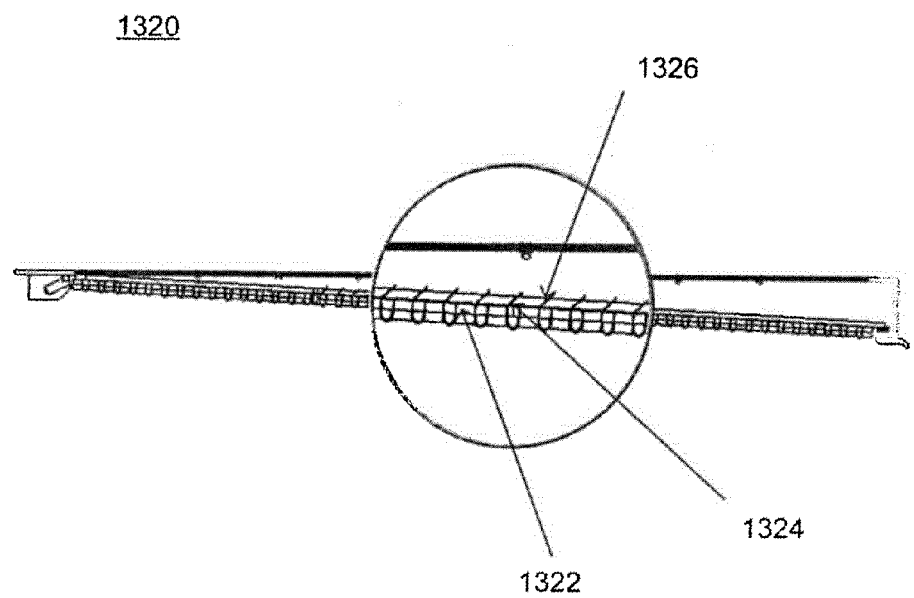
FIG. 13D is a perspective cross-sectional view of a second jet box used in Example 8.

The second jet box 1320 used in this Example is shown in FIG. 13D. Referring to FIG. 13D, the second jet box is generally depicted as reference number 1320. The second jet box 1320 includes feed channels 1322 at a height of about 6.4 mm, and a coarse screen (mesh 1322) having a substantially uniform square size of about 0.76 mm. The mesh 1324 was formed from stainless steel and had a wire diameter of about 0.5 mm. A diverter vane 1326 was utilized at an angle of about 45 degrees. In operation, a liquid plenum pressure was 5.3 psi for the jets generated. The pressures were measured with an analog pressure gauge.

Figure 13E:
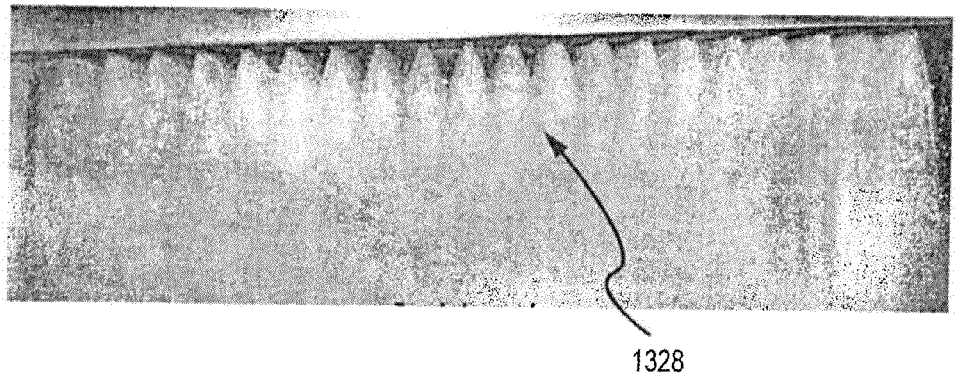
FIG. 13E is a photograph of a side view of jets formed in Example 8 with the first jet box.
Figure 13F:
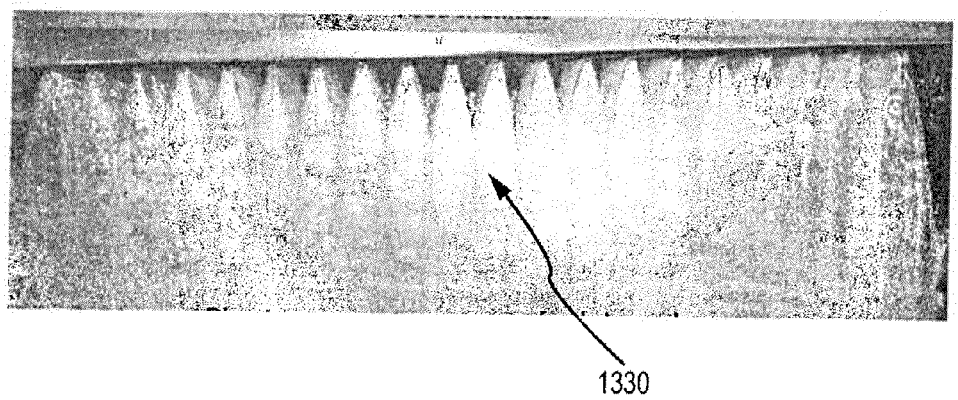
FIG. 13F is a photograph of a side view of jets formed in Example 8 with the second jet box.

FIG. 13E is a photograph of jets formed using the first jet box. FIG. 13F is a photograph of jets formed using feed channels, mesh and a diverter unit with a second jet box.

Comparing FIGS. 13E-F, it is shown that the second jet box using diverter vanes, screen, and flow channels produces more stable flat jets than feed channels alone. That is, the stability of the jets 1328 in FIG. 13E is less stable than jets 1330 in FIG. 13G, e.g., jets 1328 break up at a shorter distance from the nozzle than jets 1330.

Example 9

In this Example, an apparatus similar to the one shown in FIG. 13A was utilized with a jet having no stability unit, i.e., no diverter unit, no mesh and no feed channels. The jet box in this Example included 20 nozzle banks where each nozzle bank included 45 nozzles. The nozzle to nozzle spacing was 4 mm; the nozzle bank to nozzle bank spacing was about 2 cm.

Each nozzle was formed by cutting a 0.056 inch deep hole into a tube (not shown), i.e., a 0.056 DOC nozzle. The tube was then cut and laser welded into a plate thereby forming the plate of nozzle banks. The tube was stainless steel material having a thickness of 0.90 mm. The plate was stainless steel material having a thickness of 6.4 mm inches. Each nozzle was also formed to have a major and minor axis of 2.67 mm and 1.2 mm, respectively.

The liquid plenum pressure was maintained at 7 psi so the only change was the liquid flow velocity through the plenum. Also, it was observed that lowering the pressure in the plenum would reduce the liquid flow velocity, therefore, the resulting jets were longer before the instabilities began to break them up.

Figure 14:
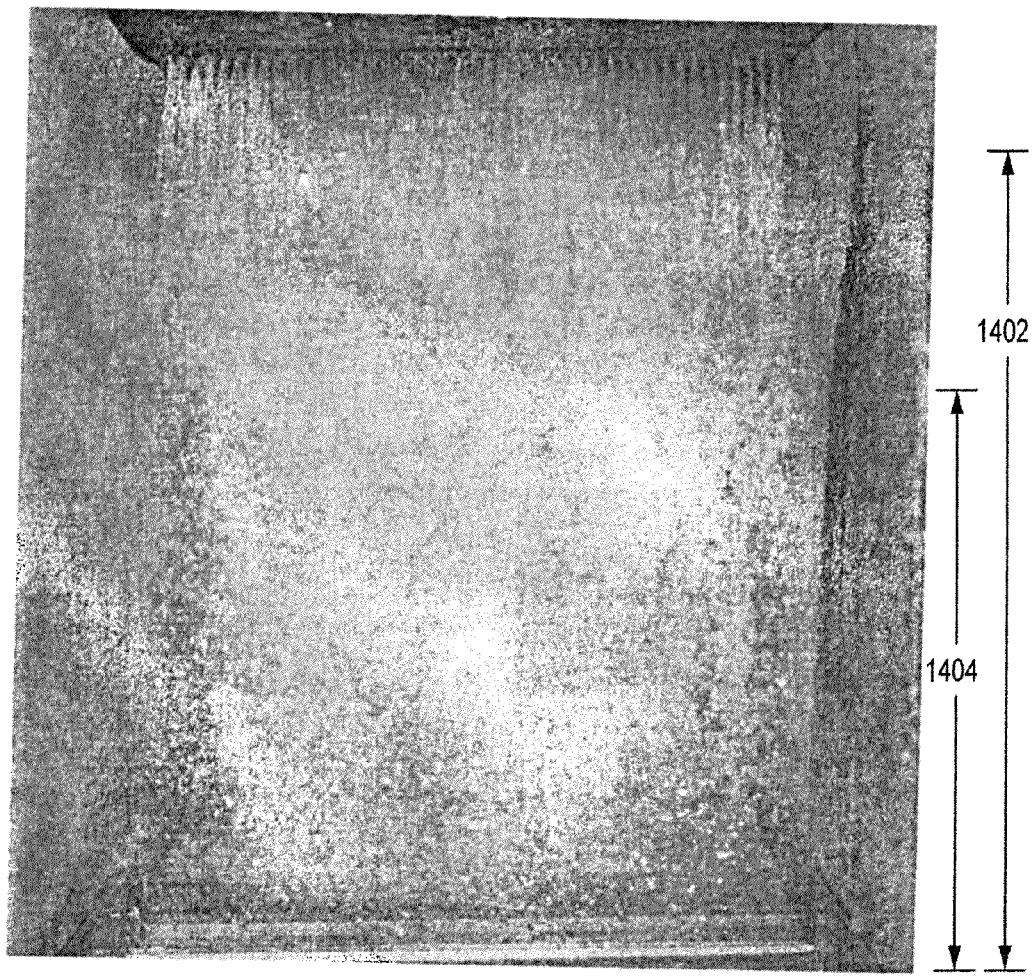
FIG. 14 is a photograph of a side view of jets formed in Example 9.

FIG. 14 is a photograph of a side of the jets from Example 9. As shown, in section 1402 the jets have broken up, that is, the jets have broken up within about an inch and a half of the nozzles. At section 1404 or about a third of the distance from the nozzle there is no semblance of the flat jets, but only drops.

Example 10

In Example 10, a singlet delta oxygen generator was utilized. In this Example, an apparatus similar to the one described in Example 1 was utilized. The nozzles have a major and minor axis of 2.2 mm and 0.81 mm, respectively. The nominal operating plenum pressure for the device is 20 psi. The nozzle plate includes 25 nozzle banks with alternating 39 and 40 nozzles per bank. The nozzle to nozzle spacing was about 3 mm and the nozzle bank to nozzle bank spacing was about 9.6 mm. The apparatus was also similar to the one described in FIG. 2 of U.S. Pat. No. 7,379,487, which is hereby incorporated by reference as if fully set forth herein.

A byproduct of reacting chlorine gas ($Cl_2$) diluted in helium (He) with basic hydrogen peroxide (BHP, $KO_2H$) is salt (KCl) according to the reaction:

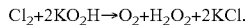

$$Cl_2 + 2KO_2H \rightarrow O_2 + H_2O_2 + 2KCl.$$

Typical reactor operation is near 60 Torr with $Cl_2$/He flowing into the reactor and $O_2$/He flowing out of the reactor, with nominal $Cl_2 \rightarrow O_2$ conversion>90%. Standard BHP is m=5 moles/kg $KO_2H$, and has been reacted with $Cl_2$ to <m=1 mole/kg $KO_2H$ in our flat jet reactor ($\Delta m=4$), with the produced KCl staying in the solution as an insoluble salt. The salt produced in the reaction is the same as the $KO_2H$ used, therefore 298 g salt are produced per kg BHP in the $\Delta m=4$ reaction. However, there was no noticeable deterioration of the jets during these experiments, even at nearly 30% salt by weight in the slurry.

The slurry formed from the salt in this reaction is the ideal case in that the salt forms smaller, loosely bound aggregates. The individual salt crystals are typically small (<200 μm), but can form larger clusters. These clusters are easily broken up by the circulation of the slurry through the pump and/or nozzle orifices. Provided constant recirculation of the slurry, little to no effect of the salt is seen on the jets.

Example 11

In Example 11, a single jet test apparatus was utilized to form a single jet in order to illustrate how a slurry exists the nozzle. This Example also tested three separate nozzle plates having different depth of cuts (DOC) being 0.052 inches, 0.054 inches, and 0.056 inches.

The apparatus is described with reference to FIGS. 5A-5C. Referring to FIGS. 5A-5C, the apparatus is generally depicted as reference number 500 and includes an operating chamber 502, two fluid inlets 504 and 506 and a fluid exit 508.

The fluid exit 508 is connected to a recirculation loop and coupled to a pump (not shown) and the fluid inlet 504. A pressure gauge (not shown) for measuring fluid pressure in a plenum is provided on the apparatus. The plenum is a sealed chamber formed above the plate 512. The plenum has dimensions of 226 mm (wide)×28.5 mm (tall)×20 mm (deep). The nozzle plate 512 includes three nozzle banks 514, 516, and 518. In this configuration each nozzle bank includes three nozzles. In particular, nozzle bank 516 includes a first nozzle 520, a second nozzle 522, and a third nozzle 524. Each nozzle is separated by a uniform distance—the distance between the first nozzle 520 and the second nozzle 522 is 4 mm. The distance between the nozzle banks 514, 516, and 518 is also uniform. In this Example, the distance between nozzle bank 514 and nozzle bank 516 is about 5 cm.

In this Example there are three separate nozzle plates having a 0.052 DOC nozzle plate, 0.054 DOC nozzle plate, and 0.056 DOC nozzle plate. The 0.052 DOC nozzle plate was formed in each nozzle (520, 522, 524) by cutting a 0.052 inch deep hole into a tube (not shown). The nozzles from the 0.052 DOC nozzle plate have a major and minor axis of 2.37 mm and 0.99 mm, respectively. The 0.054 DOC nozzle plate was formed in separate nozzle plate by cutting a 0.054 inch deep hole into a tube (not shown). The nozzles from the 0.054 DOC nozzle plate have a major and minor axis of 2.53 mm and 1.12 mm, respectively. The 0.056 DOC nozzle plate was formed in a separate nozzle plate by cutting a 0.056 inch deep hole into a tube (not shown). The nozzles from the 0.056 DOC nozzle plate have a major and minor axis of 2.67 mm inches and 1.2 mm, respectively.

The tubes of each nozzle were then cut and laser welded into a plate thereby forming the plate of nozzle banks. The tube was stainless steel material having a thickness of 0.90 mm. The nozzle plate was stainless steel material having a thickness of 4.65 mm. In this Example, nozzle bank 514 and nozzle bank 518 were plugged by filling with a bead of wax (high melting point parafin). In addition, in nozzle bank 516, nozzles 520 and 524 were also filled with the same wax material, thereby leaving only one nozzle 522 operational. The plate 512 was then positioned in the apparatus 500 as shown in FIG. 5A. There is also a liquid plenum (not expressly shown) above the plate 512 in which the liquid is configured to flow substantially horizontally across the plate 512. The area ratio between the opening of the nozzle 120 and the liquid plenum is about 1:350.

Various runs were conducted at different pressures with different liquids as shown in Table 5.

TABLE 5

| | Concentration [%, w/w] | Pressure [psi] | DOC [inches] | Width [mm] | Length [mm] | Breakup Length [mm] |
|---|---|---|---|---|---|---|
| $Na_2SO_4$ | 10 | 11 | 0.052 | 28 | N/A | 135 |
| Gypsum | 5 | 11 | 0.052 | 29 | N/A | 90 |
| $Na_2SO_4$ | 10 | 9 | 0.054 | 28 | N/A | 146 |
| Gypsum | 5 | 9 | 0.054 | 31 | N/A | 110 |
| $Na_2SO_4$ | 10 | 7 | 0.056 | 25 | 217 | 158. |
| Gypsum | 5 | 7 | 0.056 | 28 | N/A | 112 |

Figure 15:
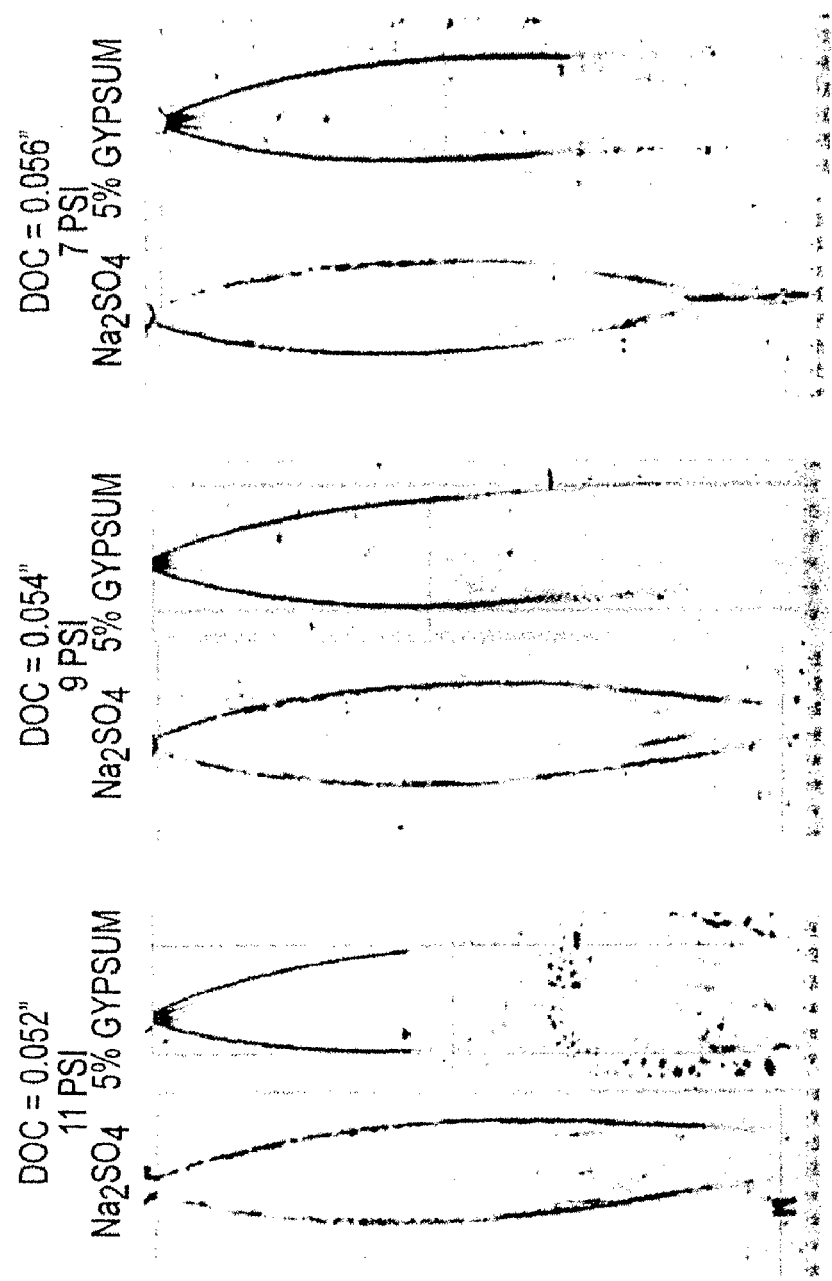
FIG. 15 is a photograph of side views of jets formed in Example 11.

FIG. 15 is a photograph of side views of jets formed in Example 11. Referring to FIG. 15 and Table 5. The sodium sulfate solution was used as a control.

$Na_2SO_4$ vs. Gypsum—11 psi:

The 0.052 DOC nozzles operated at 11 psi with 5% by weight gypsum formed liquid jets. When compared to the control fluid ($NaSO_4$) operated at the same plenum pressure of 11 psi, it is shown that the gypsum solution produced wider jets. This is indicative of lower surface tension for the gypsum solution. Additionally, the breakup length of the gypsum is smaller than the break up length of the control solution.

$Na_2SO_4$ vs. Gypsum—9 psi:

The 0.052 DOC nozzles operated at 9 psi with 5% by weight gypsum formed liquid jets. When compared to the control fluid ($NaSO_4$) operated at the same plenum pressure of 9 psi, the gypsum solution produced wider jets, again this is indicative of lower surface tension. Additionally, the breakup length of the gypsum is smaller than that of the control solution.

$Na_2SO_4$ vs. Gypsum—7 psi:

The 0.052 DOC nozzles operated at 7 PSI with 5% by weight gypsum formed liquid jets. When compared to the control fluid ($NaSO_4$) operated at the same plenum pressure of 7 psi, the gypsum solution produced wider jets, again being indicative of lower surface tension. Additionally, the break up length of the gypsum is smaller than that of the control solution.

Therefore, it is shown that unlike the salt of the previous Examples, the gypsum particles tend to aggregate and, given the settling time, form particles large enough to clog jets. Under conditions with little aggregation time, the jets formed with 5% gypsum were slightly larger than the control case due to the gypsum reducing the surface tension of the water. It was found that the lower the operating pressure for this slurry, the more closely it would resemble the jets formed with no solid present. Moreover, selecting a nozzle that is specific for this type of slurry will compensate for the wider jets formed when using nozzles designed for solutions similar in surface tension and viscosity to water.

Example 12

In Example 12, an array of jets is formed with a test stand apparatus as illustrated in FIG. 5A. The test stand is generally depicted as reference number 500 and includes an operating chamber 502, a fluid inlet 504, a fluid exit 508 and a plenum 509. The plenum 509 is arranged above a nozzle plate 512 forming a sealed chamber over the nozzle plate 512. A pressure gauge (not shown) for measuring inlet fluid pressure was also utilized.

In this Example, a nozzle plate 600 similar to that shown in FIG. 6A but included four nozzle banks compared to the three nozzle banks shown in the figure was used. The construction of the nozzle plates is similar to that of Example 2. In this configuration each nozzle bank includes twenty four nozzles. Each nozzle is separated by a uniform distance—4 mm. The distance between the nozzle banks is also uniform. In this example, the distance between nozzle banks is 2 cm. For the testing all four of the nozzle banks were run.

In this test, the solution was composed of 0.47 lbs of an unknown size post bag house fly ash to water, corresponding to a 0.2% (w/w) mixture. The fly ash was obtained from Colorado Springs Utilities Drake power plant located in Colorado Springs, Colo. Nozzles with a DOC of 0.053 were used in the test. The nozzles from the 0.053 DOC have a major and minor axis of 2.45 mm inches and 1.05 mm, respectively. The plenum pressure was 9 psi, measured by an analog pressure gauge. The test stand was operated continuously for about 1,500 hours. During the extended test, no noticeable jet degradation in the jets was observed.

Example 13

In Example 13, a test apparatus was utilized to illustrate vacuum stripping of $CO_2$ from an aqueous solution of potassium carbonate ($K_2CO_3$), piperazine (PZ) where PZ is 1,4-Diaminocyclohexane) and $CO_2$ reaction products which are presumably piperazine carbamate ($PZCOO^-$) and piperazine dicarbamate ($PZ(COO^-)_2$) and their protonated forms under normal operating conditions. This Example is applicable to post combustion carbon capture ($CO_2$ capture) systems that require solvent regeneration and $CO_2$ sequestration from a combustion flue gas.

A single stage apparatus as shown in FIG. 5A was used. In this Example the apparatus can be classified as a stripper. The principal components of the apparatus included a jet nozzle plate and plenum, a gas-liquid separator, a liquid feed, and a gas feed as discussed with reference to FIG. 5A, herein.

In this Example, the apparatus was run under a vacuum stripping mode, that is, $CO_2$ gas was desorbed rather than absorbed from the jets. The jet nozzle plate used in this Example was designed slightly different than that discussed previously and will now be described. A single nozzle plate was used that was 5 cm in width and 15 cm in length. The cross sectional entrance channel was 5 cm×14 cm. In this Example four nozzle banks were used, each nozzle bank included twelve rows of nozzles per row. The nozzle-to-nozzle spacing was about 4 mm. The distance between adjacent nozzle banks was about 30 mm. Each nozzle had a nominal major and minor axis of 2.67 mm and 1.2 mm, respectively. The liquid plenum above the plate was configured to deliver a uniform vertically flowing liquid flat jets of 14 cm in nominal length.

The apparatus also included a vacuum system that included a mechanical rotary vane pump backed by a roots blower to achieve background pressure 200 mTorr. An absorption cell fitted with a 10 cm long path length and an FTIR spectrometer was also used to measure desorbed $CO_2$ and water absorbance, partial pressure and fluxes from the jet pack. The total pressure in the stripper and in the absorption cell were measured using 0-1000 and 0-100 Torr absolute capacitance manometers, respectively. The pressure in the absorption cell was calculated as the average of the two pressures to account for the pressure drop across the absorption cell.

Pressure adjustments in the stripper and optical cell were made by adjusting pressure control valves mounted on the vacuum pump and stripper exit. The absorption cell was connected to the stripper by a 1.27 cm O.D. plastic tube. Windows in the absorption cell were kept warm and free from water condensation by a blowing a small flow of heated nitrogen over the absorption cell windows. A small amount of $CO_2$ serving as a tracer gas was admitted downstream of the stripper to calibrate and measure the $CO_2$ flux from the jet pack. The trace gas was admitted using a calibrated electronic mass flow controller. The temperature of the solvent in the stripper was heated and maintained using a recirculating thermostatic bath. The temperature of the solvent was measured using three thermocouples, one at the jet pack, one at the top of the catch tank and one at the bottom of the catch tank.

A simulated rich solvent mixture with a loading of 0.50 mol $CO_2$ per mole of total alkalinity was prepared by combining 5 moles KHCO3 and 2.5 moles piperazine with 1 kg of water. This loading was prepared to simulate a normal operating condition found in a CO2 combustion/flue gas capture experiment. Since the loading of the solvent decreases during stripping experiments, the solvent was reloaded with additional CO2 to keep the solvent loading approximately constant. This was done by admitting CO2 gas into the stripper chamber under atmospheric conditions and running the recirculation pump to create the flat jets. The resulting loading was determined by measuring the equilibrium vapor pressure of CO2 and using the equation given by Oyenekan, et al., *Alternative Stripper Configurations for $CO_2$ Capture by Aqueous Amines*, AIChE Journal, Vol. 53, No. 12, pp. 3144-3154, (2007), which is hereby incorporated by reference.

The partial pressures of the $CO_2$ and $H_2O$ were calculated by comparing the rotational line intensities to those in the reference spectra that were obtained with calibrated $CO_2$ and water flow rates. The absorption spectra of $CO_2$ and $H_2O$ were measured in the absorption cell at a pressure different from the stripper pressure. To calculate the $CO_2$ and $H_2O$ partial vapor pressures in the stripper, the partial vapor pressures measured in the absorption cell were multiplied by the ratio of the pressure in the reactor to the pressure in the cell:

$$P^{reactor}_{CO2} = P^{cell}_{CO2} \frac{P^{reactor}}{P^{cell}}$$

$$P^{reactor}_{H2O} = P^{cell}_{H2O} \frac{P^{reactor}}{P^{cell}}$$

Eqs. 1-2

Figure 16:
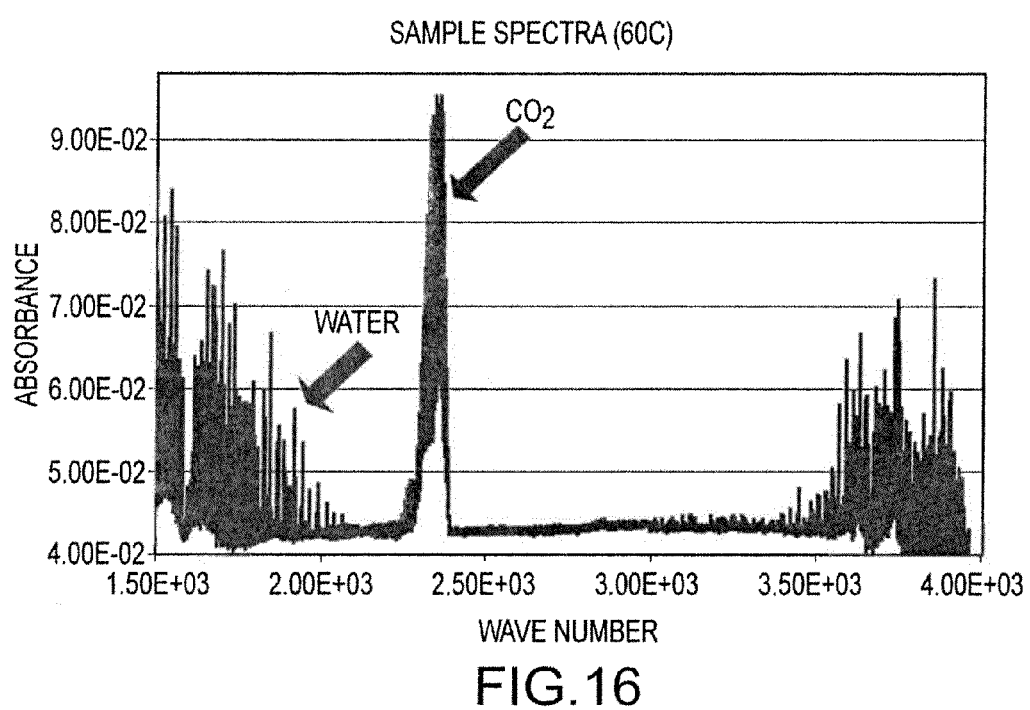
FIG. 16 is a graph of a sample spectra according to Example 13.

FIG. 16 shows a sample spectrum of $CO_2$ stripping data at 60° C. and 23 kPa total pressure according to this Example. The measured partial pressure and flow of $CO_2$ flow desorbing from the flat jet array were 1.93 kPa and 0.61 Standard Liter per Minute, respectively. Once the $CO_2$ flow and pressure are measured, the mass transfer coefficient, k, for desorbing from the jets can be calculated using the following equation:

$$J = k \times S \times (P^{equilibrium}_{CO2} - P^{reactor}_{CO2})$$

Eq. 3

In this equation J is the $CO_2$ flow, S is the interfacial area (1334 cm²) and the term in the brackets is the driving force. To obtain the mass transfer coefficient in cm/s units the pressure was converted to concentration units. A mass transfer coefficient of 2.3 cm/s for $CO_2$ desorption from the jets was measured. In operating the stripper as single stage system, the pressure of desorbed $CO_2$ was 0.8 of the equilibrium vapor pressure. The data is summarized in Table 6.

TABLE 6

| | |
|---|---|
| Stripper Pressure | 23 kPa |
| $CO_2$ Vapor Pressure (stripper) | 1.93 kPa |
| $CO_2$ flow rate ($F_1$) | 0.61 SLM |
| P/P* | 0.81 |
| k, cm/s, using S = 1.3*10³ cm² | 2.3 |

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of processing gas phase molecules with a gas liquid contactor, comprising the steps of:
   forming a plurality of essentially planar liquid jets, each of said liquid jets comprising a substantially planar sheet of liquid, said plurality of liquid jets arranged in substantially parallel planes, wherein the essentially planar liquid jets are formed with an aqueous slurry, wherein at least one of the plurality of essentially planar liquid jets comprises a thickness in a range of about 10 μm to about 1000 μm;

providing gas with reactive or soluble gas phase molecules; and removing at least a portion of the gas phase molecules by a mass transfer interaction between the gas phase molecules and the liquid jets.

2. The method of claim 1, wherein at least one of the plurality of essentially planar liquid jets comprises a length in a range from about 5 cm to about 30 cm.

3. The method of claim 1, wherein at least one of the plurality of essentially planar liquid jets comprises a length in a range from about 5 cm to about 20 cm.

4. The method of claim 1, wherein at least one of the plurality of essentially planar liquid jets has a velocity less than 15 m/sec.

5. The method of claim 1, wherein at least one of the plurality of essentially planar liquid jets has a velocity in a range from about 5 m/sec to about 10 m/sec.

6. The method of claim 1, wherein the aqueous slurry comprises particles, wherein the particles have sizes up to about 500 microns 7. The method of claim 1, wherein the aqueous slurry comprises particles, wherein the particles have sizes up to about 300 microns.

8. The method of claim 1, wherein the aqueous slurry comprises particles, wherein the particles have sizes up to about 80 microns.

9. The method of claim 1, wherein the slurry comprises a solid concentration in a range from about 0.2% (w/w) to about 30% (w/w).

10. The method of claim 1, wherein the solid concentration is in a range from about 10% (w/w) to about 25% (w/w).

11. The method of claim 1, wherein the gas phase molecules comprise at least one of sulfur oxides, nitrogen oxides, carbon dioxide, ammonia, acid gases, amines, halogens, and oxygen.

12. The method of claim 1, wherein the aqueous slurry comprises at least one of ammonium salts, amines, alkanolamines, alkali salts, alkaline earth salts, peroxides, and hypochlorites.

13. The method of claim 1, wherein the aqueous slurry comprises at least one of $Ca(OH)_2$ and $Mg(OH)_2$.

14. The method of claim 1, wherein the aqueous slurry comprises fly ash.

15. The method of claim 1, wherein the aqueous slurry comprises a solid material and water.

16. The method of claim 15, wherein the solid material comprises an alkaline material.

17. The method of claim 16, wherein the alkaline material comprises silicates.

18. The method of claim 17, wherein the silicates comprise calcium/magnesium silicates.

19. The method of claim 18, wherein the calcium/magnesium silicates comprise at least one of olivine material, wollastonite material, and serpentine material.

20. The method of claim 16, wherein the alkaline material comprises an industrial waste alkaline material.

21. The method of claim 20, wherein the industrial waste alkaline material comprises at least one of steel slag, cement kiln dust, and fly ash.

22. The method of claim 16, wherein the solid material are in a range from about 1% (w/w) to about 20% (w/w).

23. A method of processing gas phase molecules with a gas liquid contactor, comprising the steps of:

forming a plurality of essentially planar liquid jets, wherein the essentially planar liquid jets are formed with an aqueous slurry comprising a solid concentration in a range from about 0.2% (w/w) to about 30% (w/w), wherein at least one of the plurality of essentially planar liquid jets comprises a width and thickness, wherein the width is at least ten times the thickness;

providing gas with reactive or soluble gas phase molecules; and removing at least a portion of the gas phase molecules by a mass transfer interaction between the gas phase molecules and the liquid jets.

24. A method of processing gas phase molecules with a gas liquid contactor, comprising the steps of:

forming a plurality of essentially planar liquid jets, wherein the essentially planar liquid jets are formed with an aqueous slurry comprising particles having at least one particle with a size up to about 500 microns, wherein at least one of the plurality of essentially planar liquid jets comprises a thickness, length and width, wherein the length to width ratio is in a range of about 0.3 to about 20;

providing a gas with a pollutant; and removing at least a portion of the pollutant from the gas by a mass transfer interaction between the gas phase molecules and the liquid jets.

25. The method of claim 24, wherein at least one of the plurality of essentially planar liquid jets comprises a thickness in a range from about 10 μm to about 1000 μm.

26. The method of claim 24, wherein at least one of the plurality of essentially planar liquid jets comprises a thickness in a range from about 10 μm to about 250 μm.

27. A method of processing gas phase molecules with a gas liquid contactor, comprising the steps of:

forming a plurality of essentially planar liquid jets, wherein the essentially planar liquid jets are formed with an aqueous slurry comprising particles having at least one particle with a size up to about 500 microns and has a solid concentration in a range from about 0.2% (w/w) to about 30% (w/w), wherein at least one of the plurality of essentially planar liquid jets comprises a thickness, length and width, wherein the length to width ratio is about 8:1 or greater;

providing a gas with a pollutant; and removing at least a portion of the pollutant from the gas by a mass transfer interaction between the gas phase molecules and the liquid jets.

* * * * *